(12) United States Patent
Soukhojak et al.

(10) Patent No.: US 8,361,422 B2
(45) Date of Patent: Jan. 29, 2013

(54) METHOD AND DEVICES FOR HEATING UREA-CONTAINING MATERIALS IN VEHICLE EMISSION CONTROL SYSTEM

(75) Inventors: Andrey Soukhojak, Midland, MI (US); David H. Bank, Midland, MI (US)

(73) Assignee: Dow Global Technologies LLC, Midland, MI (US)

(*) Notice: Subject to any disclaimer, the term of this patent is extended or adjusted under 35 U.S.C. 154(b) by 14 days.

(21) Appl. No.: 13/209,630

(22) Filed: Aug. 15, 2011

(65) Prior Publication Data

US 2012/0045378 A1 Feb. 23, 2012

Related U.S. Application Data

(60) Provisional application No. 61/375,077, filed on Aug. 19, 2010, provisional application No. 61/375,080, filed on Aug. 19, 2010.

(51) Int. Cl.
*B01D 53/94* (2006.01)
*B01J 19/00* (2006.01)
*C01C 1/08* (2006.01)
*F01N 3/10* (2006.01)
*F01N 3/18* (2006.01)

(52) U.S. Cl. ........... 423/212; 423/235; 423/239.1; 422/187; 422/198; 422/200; 422/164; 165/41; 165/43; 165/104.11; 165/902; 165/911; 60/303; 60/317; 60/320

(58) Field of Classification Search ............ 422/187, 422/198, 200, 164; 165/41, 43, 104.11, 902, 165/911; 423/212, 239.1, 235; 60/303, 317, 60/320

See application file for complete search history.

(56) References Cited

U.S. PATENT DOCUMENTS

| | | | |
|---|---|---|---|
| 5,296,206 A * | 3/1994 | Cho et al. ............... | 423/235 |
| 5,968,464 A | 10/1999 | Peter-Hoblyn et al. | |
| 6,928,807 B2 * | 8/2005 | Jacob et al. ............ | 60/286 |
| 7,008,603 B2 | 3/2006 | Brooks et al. | |
| 7,275,366 B2 * | 10/2007 | Powell et al. .......... | 60/320 |
| 2008/0260597 A1 | 10/2008 | Suzuki et al. | |
| 2008/0267837 A1 | 10/2008 | Phelps et al. | |
| 2009/0127511 A1 | 5/2009 | Bruck et al. | |
| 2009/0211726 A1 | 8/2009 | Bank et al. | |
| 2009/0250189 A1 | 10/2009 | Soukhojak et al. | |
| 2009/0257924 A1 | 10/2009 | Dismon et al. | |
| 2009/0297417 A1 | 12/2009 | Sun et al. | |
| 2012/0045378 A1 * | 2/2012 | Soukhojak et al. ..... | 423/212 |

FOREIGN PATENT DOCUMENTS

| | | |
|---|---|---|
| WO | 2011037596 A1 | 3/2011 |
| WO | 2011094371 A2 | 8/2011 |

OTHER PUBLICATIONS

Sharma, Atul, et al., Renewable & Sustainable Energy Reviews, 13 (2009) 318-345, 2007 Elsevier Ltd., Review on thermal energy storage with phase change materials and applications, India.

Zalba, Belen, et al., Applied Thermal Engineering 23 (2003) 251-283, Review on thermal energy storage with phase change: materials, heat transfer analysis and applications, Pergamon, 2002 Elsevier Ltd., Spain.

(Continued)

*Primary Examiner* — Timothy Vanoy

(57) ABSTRACT

The invention relates to systems and methods for heating a solid or liquid reducing material such as an urea-containing material for $NO_x$ selective catalytic reduction ('SCR') using a heat stored in a thermal energy storage material, such as a phase change material. The stored heat may be heat from an exhaust waste, such as from an exhaust gas of an internal combustion engine. The reducing material may be a solid reducing material. Other reducing materials include aqueous solutions such as an aqueous solution containing, consisting essentially of, or consisting of urea and water. In one aspect, the process may include a step of evaporating an aqueous solution of urea for immediate urea hydrolysis.

20 Claims, 5 Drawing Sheets

OTHER PUBLICATIONS

Mitsuru, Hosoya, JP2008075620A, Abstract, Hino Motors Ltd., Mar. 4, 2008, "Exhaust Emission Control Device".

Mitsuru, Hosoya, 2007002697A, Abstract, Hino Motors Ltd., Jan. 11, 2007, "Exhaust Emission Control Device".

Lee Soo Tae, et al., KR20090082669A, Abstract, Panasia Co. Ltd, Jul. 31, 2009, "Regenerative Exhaust Gas Denitrification Apparatus Comprising First and Second Thermal Storage Chambers in Which Thermal Storage Mediums Are Installed to Heat Air Using Heat Accumulated by Exhaust Gas".

Effelsberg, Erwin, et al., DE4408826C1, Abstract, MTU Friedrichshafen GmbH, May 24, 1995, "Exhaust gas system with heat exchanger".

* cited by examiner

METHOD AND DEVICES FOR HEATING UREA-CONTAINING MATERIALS IN VEHICLE EMISSION CONTROL SYSTEM

CLAIM OF BENEFIT OF FILING DATE

The present application claims the benefit of the filing date of U.S. Provisional Application Ser. Nos. 61/375,077 filed Aug. 19, 2010 and 61/375,080 filed Aug. 19, 2010, which are both incorporated herein by reference in their entirety for all purposes.

FIELD OF THE INVENTION

The present invention relates to a method for generating a reductant gas, such as ammonia, from a solid or liquid reducing material, such as an urea-containing material, for $NO_x$ selective catalytic reduction ('SCR') using an exhaust waste heat stored in a thermal energy storage material, such as a phase change material. More specifically, the present invention relates to methods for evaporation of a liquid reducing material (e.g., an aqueous solution of urea and immediate urea hydrolysis), and to methods for heating a solid reducing material.

BACKGROUND OF THE INVENTION

Industry in general has been actively seeking a novel approach to capture and store waste heat efficiently such that it can be utilized at a more opportune time. Further, the desire to achieve energy storage in a compact space demands the development of novel materials that are capable of storing high energy content per unit weight and unit volume. Areas of potential application of breakthrough technology include transportation, solar energy, industrial manufacturing processes as well as municipal and/or commercial building heating.

In the transportation industry, exhaust aftertreatment systems, also known as emission control devices, are used to reduce pollutant emissions. Such aftertreatment systems typically remove pollutants from exhaust gases after they are discharged from the combustion chamber. They include, as examples, catalytic converters, diesel particulate filters, and diesel oxidation catalysts.

It is known in some applications that a solution of urea is injected into the exhaust gas stream of the vehicle to aid in the reduction of $NO_x$ (i.e., nitrogen oxide), such as nitrogen II oxide (i.e., NO) and/or nitrogen IV oxide (i.e., $NO_2$), in a vehicle's emission control system. In the emission control system, (e.g., in an ammonia producing reactor of an emission control system) the urea solution is converted into ammonia ($NH_3$) and $CO_2$. The ammonia reacts with nitrogen oxides $NO_x$ contained in the exhaust gas in the SCR reactor and thus converts harmful $NO_x$ into benign reaction products: nitrogen gas (i.e., $N_2$) and water (i.e., $H_2O$). There are however some disadvantages using the urea solution in this application. For example, commercial aqueous solution of urea (e.g. AdBlue™, 32.5 wt % urea) has almost 7 times more water than is needed for stoichiometric hydrolysis of urea into $NH_3$ and $CO_2$. The injection of urea solution is typically carried out by spraying into an ammonia producing reactor, before entering, along with exhaust gas, the SCR reactor. Commercial aqueous solution of urea (e.g. 32.5 wt. % urea/ 67.5 wt. % water solution meeting ISO 2224 requirements and designated as AdBlue™ by the German Association of the Automobile Industry, such as Fleetguard® Diesel Exhaust Fluid (DEF) available commercially from Cummins Filtration, and BlueTEC® available commercially from Daimler AG) has almost 7 times more water than is needed for stoichiometric hydrolysis of urea into $NH_3$ and $CO_2$. If this solution is injected directly into the ammonia producing reactor, the excess water will cause cooling of the exhaust gas, as the excess water consumes heat (e.g., latent heat of vaporization and sensible heat). This may result in a reduction in temperature such that the ammonia producing reactor and or the SCR reactor does not function efficiently, especially in situations when the temperature where the urea solution is sprayed is relatively low (e.g., about 300° C. or less, or about 250° C. or less). The low temperature usually happens when the exhaust temperature and flow rate are low in urban driving conditions and/or when the vehicle is stopped with its engine idling. When this happens, it can result in a solid deposit formation and/or suboptimal temperature in the SCR reactor. This cooling effect can also result in higher fuel consumption due to high degree of exhaust gas recirculation (EGR) needed to keep the amount of emitted $NO_x$ low, since EGR remains the only $NO_x$ emission reducing means when the SCR reaction is too slow due to low temperatures in the SCR reactor. In addition, to reduce $NO_x$ emission, urea needs to decompose to release ammonia ($NH_3$) so that chemical reactions can be efficiently carried out in the SCR reactor. The processes of evaporation of excess water in the urea solution and the decomposition of urea to produce ammonia are both endothermic.

The use of urea solution has other disadvantages. The fuel efficiency of a vehicle is being compromised due to the extra and unnecessary water weight in the urea solution a vehicle has to carry. Some commercially available urea solutions freeze at −11° C. When that happens, steps will have to be taken to melt the urea solution. For example, a vehicle's exhaust system may operate with suboptimal, minimal or even no reduction of $NO_x$, emissions until the engine compartment warms up from the heat of combustion and melts the urea solution.

An alternative to the use of urea solution in reducing $NO_x$ in a vehicle's exhaust aftertreatment system was disclosed in US Patent Publication No. 2008/0260597, incorporated herein by reference in its entirety. This patent publication discloses a solid reductant rod pressed against a heating element as a means to produce ammonia for SCR on demand. While this may solve the problems presented by extra water of urea solutions, the invention disclosed in this patent publication requires heat generation near the solid reductant in the solid reductant reactor in order to decompose the reductant to generate reducing gas. The heat generation requirement adds a parasitic load for the engine and the alternator, which in turn reduces the fuel efficiency of the vehicle.

Despite the benefits of using a solid reductant, in some vehicle applications, an aqueous solution (containing about 32.5 wt. % urea) is the preferred means of providing the reductant, e.g., due to handling, dosing, and delivery benefits of a liquid.

There is a need to heat both solid and liquid (e.g., aqueous solutions) reducing materials in order to efficiently reduce emissions of $NO_x$, particularly when the temperature of the exhaust gas is generally low. As such, there is a need for an alternate source of heat so that a sufficient temperature of the exhaust gas is maintained for efficient reduction of $NO_x$. For example, there is a need for devices, systems and processes for providing heat to a vehicle exhaust system that does not add a parasitic load to the engine and/or alternator for generating the heat. There is also a need for devices, systems, processes, and materials for reducing $NO_x$ emissions that function efficiently at low temperatures (e.g., about $-15°$ C. or less).

SUMMARY OF THE INVENTION

The present invention provides an efficient use of an urea-containing material (e.g., an urea solution or a solid urea-containing) for reducing the nitrogen oxide emissions from a diesel engine even when the exhaust temperature and flow rate are low. The invention provides sufficient high temperature for one or any combination of (e.g., all of) the following process steps: (1) vaporization of water, such as excess water (e.g., evaporation of water from an urea solution); (2) thermolysis of urea into $NH_3$ and isocyanic acid HNCO; or (3) hydrolysis of HNCO into $NH_3$ and $CO_2$. The present invention provides such heat by using stored heat, such as stored heat originally generated by a diesel engine. For example, the stored heat may be waste heat of the exhaust gas that has been captured and stored. The stored heat is stored in a heat storage device (i.e., a thermal-energy storage ("TES") device) containing a thermal energy storage material. The thermal energy storage material may be a phase change material. Preferably, the thermal energy storage material is encapsulated in metal containers, such as metal capsules. The heat storage devices, heat storage systems, materials, and processes employed in the present invention may include one or any combination of the features taught in published U.S. Patent Application Publication Nos. 20090211726 and 20090250189, both of which are incorporated herein by reference in their entireties. The heat storage device is in thermal communication with an ammonia producing reactor so that that heat can be transferred from the heat storage device to the ammonia producing reactor (e.g., when the temperature of the exhaust gas is too low to efficiently produce ammonia or when the temperature of the exhaust gas is too low to efficiently reduce the nitrogen oxides in the SCR reactor). The heat transfer between the heat storage device and the ammonia producing reactor may be supplied using a single-phase heat transfer fluid ("HTF") or a two-phase HTF. The heat transfer fluid may employ a liquid phase, a vapor phase, or both. The heat transfer fluid may be mechanically pumped or self-pumped. For example, the heat transfer may employ a self-pumped heat transfer fluid including a liquid phase and a vapor phase, such as described in U.S. Provisional Patent Application No. 61/245,767 (filed on Sep. 25, 2009 by Soukhojak et al.), the contents of which is incorporated herein by reference in its entirety.

The devices, systems and methods of the present invention may be employed for heating a liquid urea-containing material in an ammonia producing reactor at least partially using stored heat (such as waste heat of exhaust gas captured and stored) so that ammonia is efficiently produced for reacting with $NO_x$ in an SCR reactor. For example, the liquid urea-containing material may include an excess of water and waste heat captured and stored in a heat storage device may be employed to increase the temperature of excess water, to vaporize the excess water, or both.

The devices, systems, and methods of the present invention may be employed for heating a solid or liquid reducing material at least partially using stored heat (such as waste heat of exhaust gas captured and stored in a heat storage device) so that ammonia is efficiently produced for reacting with $NO_x$ in an SCR reactor. The devices, systems and methods may be employed for any exhaust gas that produces $NO_x$, and such as an internal combustion engine (e.g., an internal combustion engine used in an automotive application).

By employing a heat storage device one or more of the following advantages may be achieved: the need to heat the solid or liquid reducing material using heat generated by an electric heater is reduced and/or eliminated; an increased efficiency in reducing $NO_x$ emissions when idling an engine and or operating at low speeds; reduced weight and/or volume of the solid or liquid reducing material; or increased efficiency of the engine by eliminating the need to recirculate the exhaust gas (e.g., the emission gas) into a combustion chamber. The heat storage device may be employed in a system and/or method that reduces the emissions of $NO_x$, by about 5% or more, preferably about 15% or more, more preferably about 25% or more, and most preferably about 35% or more, measured at one or more of the aforementioned times during the operation of an engine, relative to a system that does not employ stored heat for heating a solid or liquid reducing material prior to reacting with an exhaust gas in an SCR reactor.

One aspect of the invention is directed at a system comprising a container for containing a supply of a solid or liquid reducing material, wherein the container has one or more exits so that the reducing material can be removed from the container; a gas producing reactor for converting at least some of the solid or liquid reducing material into ammonia and carbon dioxide, wherein the gas producing reactor is in fluid communication with the container; and a heat storage device in thermal communication with the gas producing reactor and/or a region of the one or more exits of the container, wherein the heat storage device includes one or more thermal energy storage in a sufficient amount so that the heat storage device is capable of heating at least a solid surface of the gas producing reactor and/or at least one or more exits of the container to a temperature sufficient for producing ammonia and/or carbon dioxide.

Another aspect of the invention is directed at a method comprising a step of maintaining a solid surface temperature of a vehicle ammonia-producing reactor above $200°$ C. using stored waste heat.

Yet another aspect of the invention is directed at a method comprising: feeding a feed portion of a solid or liquid reducing material into gas producing reactor; heating the feed portion of the solid or liquid reducing material, using heat stored in a heat storage device, to a temperature sufficiently high that thermolysis and/or hydrolysis occurs; wherein the solid or liquid reducing material has a concentration of urea of about 50 wt. % or more, based on the total weight of the solid or liquid reducing material; and the heat storage device includes a thermal energy storage material having a liquidus temperature sufficiently high that the solid or liquid reducing material can be heated using latent heat and/or sensible heat from the thermal energy storage material. The solid or liquid reducing material preferably is a urea-containing material.

BRIEF DESCRIPTION OF THE FIGURES

The present invention is further described in the detailed description which follows, in reference to the noted plurality of drawings by way of non-limiting examples of embodiments of the present invention, in which like reference numerals represent similar parts throughout the several views of the drawings, and wherein:

As illustrated in FIG. 1, the gas producing reactor may be positioned at least partially or entirely inside of an exhaust tube.

As illustrated in FIG. 2, the gas producing reactor may be positioned outside of an exhaust tube.

As illustrated in FIGS. 5A and 5B, the system may employ a heat storage device that includes a single flow path for both charging and discharging the heat storage device.

DETAILED DESCRIPTION OF THE PRESENT INVENTION

Figure 1:
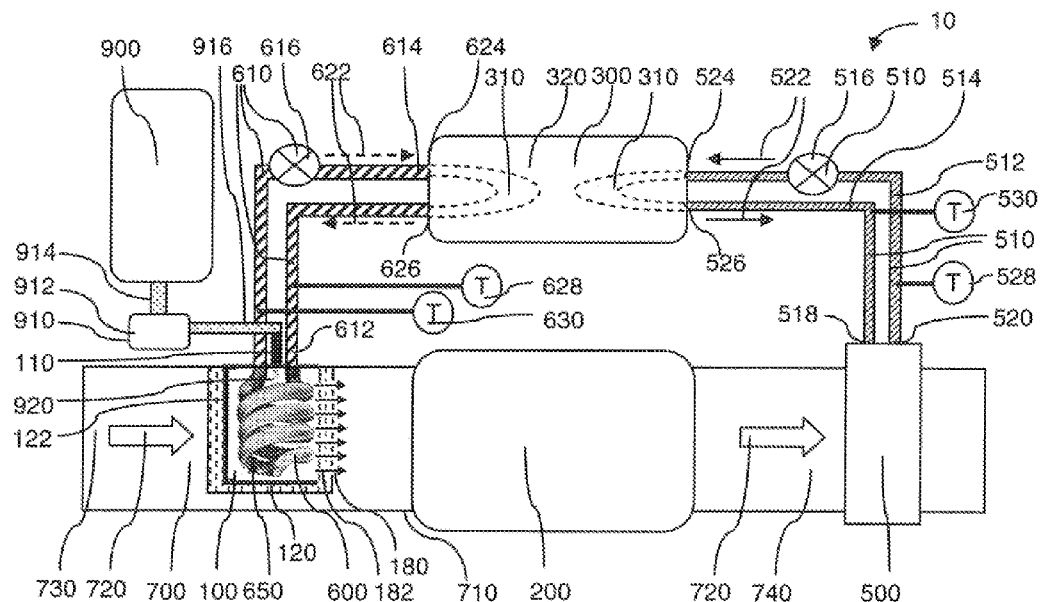
FIG. 1 is a schematic drawing illustrating features of some of the main components of a system including a gas producing reactor for reducing nitrogen oxides in an exhaust gas.

In the following detailed description, the specific embodiments of the present invention are described in connection with its preferred embodiments. However, to the extent that the following description is specific to a particular embodiment or a particular use of the present techniques, it is intended to be illustrative only and merely provides a concise description of the exemplary embodiments. Accordingly, the invention is not limited to the specific embodiments described below, but rather; the invention includes all alternatives, modifications, and equivalents falling within the true scope of the appended claims.

One or more of the problems associated with removing nitrogen oxides from an exhaust gas having a low temperature, may be overcome using a system that includes a heat storage device for providing heat to a gas producing reactor so that a reductant gas is efficiently produced from a solid or liquid reducing material. By way of example, the solid or liquid reducing material may be a material that is capable of generating ammonia, isocyanic acid, or both, such as an urea containing material. The heat storage device allows for the use of stored heat (e.g., waste heat, such as from an exhaust or other component of diesel engine) so that the need to generate heat (e.g., electrically, mechanically, or via a chemical reaction) is reduced or eliminated. The heat storage device may be in thermal contact with the gas producing reactor. For example, the heat storage device may be in thermal contact with an internal solid surface of the ammonia-producing reactor. Typically, the heat storage device will be attached to the gas producing reactor. The attachment between the heat storage device and the gas producing reactor may include a discharging loop for transferring heat from the heat storage device to the gas producing reactor. The discharging loop may include one or more lines capable of flowing a heat transfer fluid from the heat storage device to the gas producing reactor, capable of flowing a heat transfer fluid from the gas producing reactor to the heat storage device, or both. The heat storage device preferably provides heat to the gas producing reactor prior to the reductant gas flowing into the selective catalytic reduction (i.e., SCR) reactor. Typically, the gas producing reactor is located upstream of the SCR reactor. The heat storage device preferably is heated using heat from the exhaust system or a component of the exhaust system located downstream from the SCR reactor. The exhaust system may include a heat exchanger for capturing exhaust heat (e.g., waste heat) when the engine power is high and/or the exhaust temperature is high. A charging loop may be employed to transfer the heat from the heat exchanger to the heat storage device. The charging loop and the discharging loop may function asynchronously. As such, the heat storage device may be charged when the exhaust temperature is relatively high and the heat storage device may be discharged when the exhaust temperature is relatively low. Preferred heat storage device are capable of storing a sufficient amount of heat so that it can release heat necessary to sustain the endothermic processes (e.g., for producing ammonia from a urea-containing compound, and or for vaporizing any excess water in the urea-containing compound) when the engine power is low.

FIG. 1 is a schematic showing some main components in a system 10 for the catalytic reduction of nitrogen oxides. As shown in FIG. 1, a heat storage device 300 is attached to the internal solid surface 650 of the gas producing reactor 100. The attachment may be a discharging loop 610, capable of circulating a heat transfer fluid between the heat storage device 300 and a heat exchanger that is inside or connected to the gas producing reactor 100. This heat storage device 300 can absorb exhaust heat (e.g., using a charging loop) from a heat exchanger 500 downstream from the SCR reactor 200, when the engine power is high and/or the temperature of the exhaust gas 700 is high. The heat storage device 300 may release heat necessary to sustain one or more endothermic processes in the gas producing reactor 100, when the engine power is low and/or the temperature of the exhaust gas 700 is low.

The gas producing reactor may be capable of producing one or more gases for reducing nitrogen oxides so that the concentration of nitrogen oxides in an exhaust gas is reduced. The gas producing reactor may convert a solid or liquid reducing material into one or more reducing gases (i.e., into a gaseous reductant). The solid or liquid reducing material may be any material that can be converted into a reducing gas capable of reacting with one or more nitrogen oxides. The reducing gas preferably reacts with a nitrogen oxide (e.g., in the presence of a catalyst) to form nitrogen gas (i.e., $N_2(g)$).

The solid or liquid reducing material may include a material that upon heating produces ammonia, isocyanic acid (i.e., HNCO), or both. By way of example, molecules that produce gaseous ammonia, gaseous isocyanic acid, or both upon heating include: urea, ammelide; ammeline; ammonium carbonate; ammonium bicarbonate; ammonium carbamate; ammonium cyanate; ammonium salts of inorganic acids, including sulfuric acid and phosphoric acid; ammonium salts of organic acids, including formic and acetic acid; biuret; triuret, cyanuric acid; isocyanic acid; urea formaldehyde; melamine; tricyanourea or mixtures including one or more of these. Other molecules that may be used for producing a reducing gas for reacting with a nitrogen oxide include molecules that do not form HNCO, but decompose to form a mixture of gases including hydrocarbons. Examples of such compounds include amines and their salts (e.g., a carbonate), such as guanidine, guanidine carbonate, methyl amine carbonate, ethyl amine carbonate, dimethyl amine carbonate, hexamethylamine; hexamethylamine carbonate; and byproduct wastes containing urea from a chemical process. These amines with higher alkyls may be employed to the extent that the hydrocarbon components released do not interfere with the nitrogen oxide reduction reaction (e.g., in the SCR reactor). Examples of materials that may be used for the generation of ammonia, isocyanic acid, or both, include those described in US Patent Application Publication 2009/0297417 A1, incorporated herein by reference in its entirety (e.g., see paragraphs 0020-0022). The solid or liquid reducing material may additionally include one or more solid or liquid diluents. If employed, the solid or liquid diluents may be capable of reacting with another component of the solid or liquid reducing material (e.g., urea) to form the reducing gas, may be a gas at a temperature of about 120° C. and pressure of about 1 atmosphere, or preferably both. Preferably, the solid or liquid reducing material includes, or consists essentially of, or consists entirely of urea. For example, the solid or liquid reducing material may be an aqueous mixture including, consisting essentially of, or consisting entirely of urea and water.

The solid or liquid reducing material may include water. For example, water may be employed for reacting with HNCO, so that ammonia and carbon dioxide may be formed. Water may be provided to the gas producing reactor as a separate component, as part of the solid or liquid reducing material, as a part of a gas stream (such as an exhaust gas stream or an air stream) that flows through the gas producing reactor, or any combination thereof. The need for water may be understood by the considering a stoichiometric reaction for the hydrolysis of $(NH_2)_2CO$ (i.e., urea) into $NH_3$ and $CO_2$, as shown in the following equations showing the sequence of urea pyrolysis (equation 1) and hydrolysis (equation 2):

$$(NH_2)_2CO + heat \rightarrow HNCO + NH_3(g) \qquad \text{(equation 1)}$$

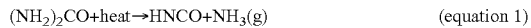

$$HNCO + NH_3(g) + H_2O \rightarrow 2NH_3(g) + CO_2(g) \qquad \text{(equation 2)}$$

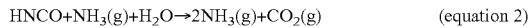

$$(NH_2)_2CO + H_2O + heat \rightarrow 2NH_3(g) + CO_2(g) \qquad \text{(net equation)}$$

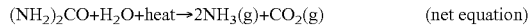

According to the net equation, 1 mole (about 60.06 g) of urea and 1 mole (about 18.02 g) of water may react to produce about two moles of ammonia and about 1 mole of carbon dioxide. The stoichometric ratio of urea to water is about 3.33 on a weight basis. The stoichometric concentration of urea and water is about 76.9 wt. % and about 23.1 wt. % respectively.

When the solid or liquid reducing material includes water, there may be excess water, such as when the weight ratio of urea to water is less than about 3.3 (e.g., less than about 3.0, or less than about 2.7). When there is excess water in the gas producing reactor, heat from the gas producing reactor will be employed to increase the temperature of the excess water and/or vaporize the excess water. This will result in an increased heat requirement for the production and heating of the reducing gas. The heat of vaporization of water is about 40.66 KJ/mole at about 100° C. As such, the heat storage device may provide sufficient heat for one or more, or even all of i) vaporizing and/or heating the excess water, ii) thermally decomposing the reactants for producing the reducing gases, iii) heating the reducing gases to a sufficient temperature for reacting with nitrogen oxides in the presence of a catalyst. It will be appreciated that without the use of stored heat from a heat storage device, the heat of vaporization of the excess water typically results in a decrease in the temperature of the exhaust gas and/or a need to generate additional heat.

The amount of water that is provided to the gas producing reactor preferably is sufficient to react with any isocyanic acid present in the reactor for forming ammonia and carbon dioxide. When using urea to generate ammonia, the ratio of urea to water on a weight basis may be about 0.25 or more, about 0.4 or more, about 0.6 or more about 0.8 or more, about 1.5 or more, or about 2.7 or more. The ratio of urea to water on a weight basis preferably is about 6 or less, more preferably about 4 or less, based on the total amount of water and urea provided to the gas producing reactor.

The liquid or solid reducing material may be provided separately from any water that is introduced into the gas producing reactor or it may include some or all of the water. For example, the liquid or solid reducing material may be substantially free of water (e.g., including less than about 20% or less water, about 10 wt. % or less water, about 5 wt. % or less water, or about 1 wt. % or less water), or even entirely free of water. The solid or liquid reducing material may be a urea-containing material consisting essentially of a first compound that produces ammonia, isocyanic acid, or both (e.g., urea) and water. For example the total concentration of the first compound (e.g., urea) and water in the reducing material may be about 80 wt. % or more, about 85 wt. % or more, about 90 wt. % or more, or about 95 wt. % or more. The urea-containing material may be a solid, such as a solid consisting essentially of the first compound (e.g., urea). The liquid or solid reducing material (e.g., urea-containing material) may be an aqueous solution having a generally low liquid (e.g., melting) temperature so that the solution does not readily freeze. Aqueous solutions including the first compound (e.g., urea) and water having a low melting temperature typically have a urea concentration of about 5 wt. % or more, preferably about 10 wt. % or more, more preferably about 20 wt. % or more and most preferably about 30 wt. % or more; and a water concentration of about 30 wt. % or more, preferably about 40 wt % or more, even more preferably about 50 wt. % or more, even more preferably about 60 wt. % or more, and most preferably about 65 wt. % or more. Exemplary aqueous solutions include binary eutectic mixtures of water and urea, such as AdBlue™ by the German Association of the Automobile Industry, Fleetguard® Diesel Exhaust Fluid (DEF) commercially available from Cummins Filtration, and BlueTEC® commercially available from Daimler AG).

The heat storage device may be designed for maintaining the temperature of the gas producing reactor above a minimum gas generating temperature so that the solid or liquid reducing material can be thermally decomposed into one or more reducing gases (i.e., capable of reducing a nitrogen oxide to form $N_2$ gas). The minimum gas generating temperature may depend on the solid or liquid reducing material. When using urea and water to produce ammonia, the minimum gas generating temperature may be about 200° C. or more, preferably about 250° C. or more, and more preferably about 300° C. or more. It may not be necessary for the entire gas producing reactor to be at or above the minimum gas generating temperature. For example, the liquid or solid reducing material may be deposited or otherwise contact a heated surface (e.g., a solid surface) where the reducing material is heated. For example, a liquid reducing material may be sprayed into the gas producing reactor. The spray of the liquid may contact a solid surface (e.g., a solid surface heated to the minimum gas generating temperature or more) where the liquid is heated. As another example, a solid surface of a heat exchanger in the gas producing reactor may be heated to the minimum gas generating temperature or more. The solid surface of the heat exchanger may directly or indirectly heat the solid or liquid reducing material. For example, the solid heated surface of the heat exchanger may heat a carrier gas that flows through the gas producing reactor so that the carrier gas transfers the heat to the solid or liquid reducing material.

The heat storage device may be designed to capture heat when the engine is operating at high power and/or the temperature of the exhaust gas is generally high. For example, the heat storage device may capture heat when the temperature of the exhaust gas (e.g., at a location downstream of the SCR reactor) is about 300° C. or more, preferably about 325° C. or more, or about 350° C. or more. It will be appreciated that during high engine power operation, the temperature of the exhaust gas temperature may reach about 300° C. or more, e.g., from about 350° C. to about 550° C.

The gas producing reactor is designed to produce one or more reducing gases for introducing into an exhaust fluid (e.g., exhaust gas) so that the concentration of nitrogen oxide can be reduced when the exhaust fluid passes through an SCR reactor. The gas producing reactor is in connection (e.g., fluid connection) with a supply of solid or liquid reducing material so that the solid or liquid reducing material may be dosed or otherwise provided to the gas producing reactor.

The gas producing reactor may include one or more fluid connections with the SCR reactor capable of flowing the one or more reducing gases into the SCR reactor. The fluid connection with the SCR reactor may be provided by a line that flows from the gas producing reactor to a portion of an exhaust system that is upstream from the SCR reactor. The fluid connection between the gas producing reactor and SCR reactor may be provided by positioning the SCR reactor partially or completely within a component of the exhaust system. The fluid connection with the SCR reactor may be provided by flowing a carrier gas, such as at least a portion of the exhaust fluid, through the gas providing reactor. For example, the exhaust gas may be employed as a carrier gas. If some of the exhaust gas is employed as a carrier gas a carrier gas flow regulator may be employed. Examples of carrier gas flow regulator include louvers and valve. The carrier gas flow regulator, if employed, preferably is a variable control regulator, so that the rate of flow can be controlled. The carrier gas flow regulator may be upstream of the gas producing reactor. The carrier gas flow regulator (e.g., the louvers) can be controlled with a pneumatic or electromagnetic actuator.

The gas producing reactor may include one or more insulating layers so that heat losses from the gas producing reactor to are reduced. For example, the gas producing reactor may be inside or in contact with an exhaust pipe, and the insulating layer may be employed to reduce the loss of heat from the gas producing reactor to the exhaust pipe and or an exhaust fluid in the pipe, particularly when the exhaust fluid is cold (e.g., at a temperature of less than about 200° C.). The insulating layer of the gas producing reactor, if employed, may be any art known insulating materials or insulating system. For example, the insulating layer may employ one or more materials having a low thermal conductivity, one or more gaps filled with air or other gas, one or more evacuated spaces (i.e., spaces having a partial vacuum), or any combination thereof. Any of the means of insulating the heat storage device described herein may be employed in insulating the gas producing reactor.

The gas producing reactor includes one or more means of heating the solid or liquid reducing material. The gas producing reactor includes a means of heating the solid or liquid reducing material using stored heat, such as waste heat stored in the heat storage device. For example, the gas producing reactor may include a thermal connection with the heat storage device. As such, the gas producing reactor may include one or more solid surfaces capable of being heated with heat from the heat storage device. The gas producing reactor may also include one or more means of heating the solid or liquid reducing material using thermal energy in an exhaust gas when the temperature of the exhaust gas is sufficiently high to heat and react the solid or liquid reducing materials (e.g., when the temperature of the exhaust gas is sufficiently high to convert urea and water into ammonia and carbon dioxide).

Figure 3A:
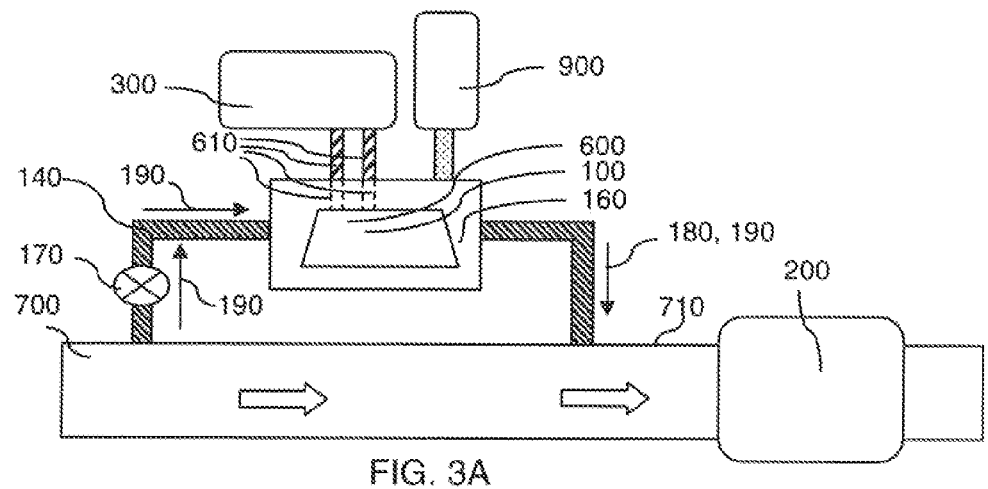
FIGS. 3A, 3B, and 3C are schematic drawings illustrating features of systems that employ a carrier gas.
Figure 3B:
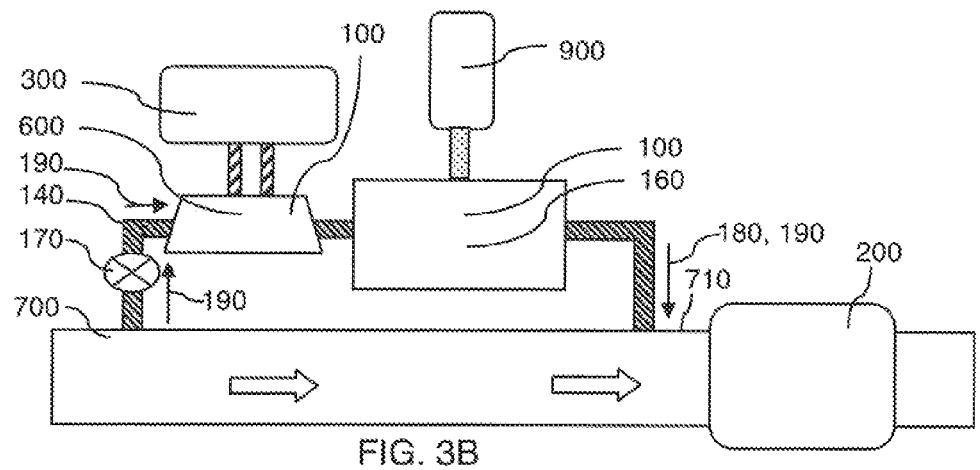

The thermal connection between the heat storage device and the gas producing reactor can be arranged in any manner that effectively transfers heat from the heat storage device to the gas producing reactor, and preferably includes one or more discharge loops capable of circulating a heat transfer fluid between the heat storage device and the gas producing reactor. For example, the gas producing reactor may include a heat exchanger. If employed, the heat exchanger may be inside the reaction chamber where the solid or liquid reducing material is introduced and/or reacted, the heat exchanger may be attached or connected to the reaction chamber (e.g., the heat exchanger may be in contact with one or more surfaces of the reaction chamber), or the heat exchanger may be located upstream of the reaction chamber. The heat exchanger may be located inside the reaction chamber of the gas producing reactor, such as illustrated in FIG. 3A. The heat exchanger may be located upstream of the reaction chamber of the gas producing reactor, such as illustrated in FIGS. 3A and 3B. As such, the gas producing reactor may be divided into two or more components, such as a heat exchanger component (e.g., for heating a carrier gas) and a reaction chamber component (e.g., for receiving a solid or liquid reducing material and/or reacting the material to produce the reducing gas).

The gas producing reactor may have a plurality of means for providing heat to the solid or liquid reducing material. The gas producing reactor may employ stored heat from a heat storage device when the temperature of the exhaust gas is low and may employ heat from the exhaust gas when the temperature of the exhaust gas is high. In this arrangement, the exhaust gas may act as a carrier gas. As such, the gas producing reactor may include a carrier gas line for flowing at least a portion of the exhaust gas through the gas producing reactor. The carrier gas may flow continuously, or the rate of flow may be controlled using one or more flow regulators. Examples of carrier gas flow regulators include pumps, valves, louvers, and the like. The regulator may be employed for reducing or preventing the flow of carrier gas through the gas producing reactor. By way of example, the flow regulator may reduce or prevent the flow of the carrier gas when the temperature of the exhaust gas is low, and allow for flow of the carrier gas when the temperature of the exhaust gas is high. The carrier gas may be employed to transfer heat from the heat exchanger of the gas producing reactor to the reaction chamber of the gas producing reactor. As such, the carrier gas may flow through the gas producing reactor even when the temperature of the exhaust gas is low, such as illustrated in FIG. 3B. Here, the stored heat from the heat storage device may only be needed when the exhaust gas has a low temperature. As the temperature of the exhaust gas increases due to higher power operation of the engine, the flow of heat through the heat discharging loop of the heat storage device may be reduced or stopped. For example, the heat discharging loop of the heat storage device may operate intermittently, such as when the temperature of the exhaust gas is low. One or more valves, one or more sensors, or both may be employed in controlling the heat discharging loop.

A carrier gas, if employed, may also be a gas other than the exhaust gas. For example the carrier gas may be air, such as ambient air. When a gas other than exhaust gas is employed for the carrier gas, the gas producing reactor may include a pump, a blower, a fan, or other means for controlling the flow of the carrier gas, such as the pump, blower or fan 150 illustrated in FIG. 3C. Although the carrier gas may be heated by other means, it generally enters the gas producing reactor at or near ambient temperature. For example, the heat storage device may be the primary or sole source of heat for the gas producing reactor. As such, the discharge loop of the heat storage device may operate in a continuous mode when reducing gas is required for the SCR reactor.

At least some of the heat for the gas producing reactor is provided from a heat storage device. The heat storage device preferably is capable of receiving heat from one or more components or devices, storing the heat, and later releasing the heat to one or more components or devices. For example, the heat storage device may receive heat from an exhaust fluid, such as when an engine is operating at a relatively high power and/or is generating excess heat. The heat storage device may store the heat until it is needed, such as at a later time when the engine is operating at a lower power. Typically, the time between receiving (i.e., absorbing) heat and releasing heat by a heat storage device varies from about one second to about 30 minutes. When longer storage of heat by a heat storage device is desired, some insulation of the device or the capsules holding the phase change materials inside the heat storage device may be needed. Such insulation may be accomplished by installing a vacuum insulation or other commonly used thermal insulation materials and methods.

The heat storage device may be any device capable of storing heat so that the heat may later be used to heat a gas producing reactor. The heat storage device preferably stores heat at a temperature sufficiently high so that when the heat is transferred to a gas producing reactor, the temperature of the gas producing reactor (e.g., the temperature of a solid surface in the gas producing reactor) becomes sufficiently high for producing one or more reducing gases. The heat storage device may include one or more thermal energy storage materials. The amount of thermal energy storage material in the heat storage device may be such that the heat storage device is capable of storing a sufficient amount of heat to increase and or maintain the temperature of the gas producing reactor above a lower limit operating temperature while the engine is idling or operating at low power. For example, the heat storage device may be capable of storing a sufficient amount of heat to increase the temperature of a solid or liquid reducing material from about 0° C. or less to about 200° C. or more for a sustained period of time (such as about 1 minute or more, about 3 minutes or more, about 10 minutes or more, about 30 minutes or more, or about 100 minutes or more). As described hereinafter, particularly preferred thermal energy storage materials for use in the heat storage device have one or more solid to liquid phase transitions at a temperature above the lower limit operating temperature of the gas producing reactor.

The heat storage device may include one or more openings (e.g., an orifices) for allowing a heat transfer fluid into the heat storage device and one or more openings (e.g., orifices) for allowing the heat transfer fluid to flow out of the heat storage device. The heat transfer fluid includes a fluid path so that during a discharging mode of operation a relatively cold heat transfer fluid flows into the heat storage device (e.g., via an inlet orifice), is heated using thermal energy stored in the heat storage device, and exits the heat storage device (e.g., via an outlet orifice), so that the temperature of the heat transfer fluid exiting the heat storage device is greater than its temperature when it entered the heat storage device. The temperature of the heat transfer fluid exiting the heat storage device is sufficient to convert the solid or liquid reducing material into the reductant gas, preferably is about 200° C. or more, more preferably about 250° C. or more, and most preferably about 300° C. or more. It will be appreciated that the temperature of the heat transfer fluid exiting the heat storage device may be less (e.g., than 200° C.), such as during transient times, such as during start up of the circulation of the heat transfer fluid.

During the discharging mode of operation, a heat transfer fluid may circulates between the gas producing reactor and the heat storage device.

The heat storage device may include additional orifices (e.g., inlets, outlets, or both) and/or flow paths, so that the device may be in thermal communication with one or more additional components. An additional orifice and/or flow path of the heat storage device may be employed for operating the heat storage device in a mode different than the discharging mode. For example, the heat storage device may include a second flow path that is used in a fluid circuit (i.e., a fluid loop) between the heat storage device and a heat source, such as a heat exchanger that receives heat from an engine exhaust. Such a circuit or loop may be a charging loop (i.e., a fluid loop capable of providing heat to the heat storage device). The charging loop may function by circulating a heat transfer fluid so that the fluid flows into a heat exchanger where the temperature of the heat transfer fluid increases and or the heat transfer fluid is vaporized, the heat transfer fluid later flows into the heat storage device which absorbs some or all of the heat so that the temperature of the heat transfer fluid decreases and/or the heat transfer fluid condenses. If the charging loop employs a different flow path through the heat storage device than the discharging loop, the two loops may use heat transfer fluids that are the same or different. If the heat transfer fluids are the same, they may have a fluid connection (e.g., they may share a supply reservoir) or they may have no fluid connections.

The heat storage device may include a flow path that is used in a plurality of modes of operation. By way of example, a flow path may be used for charging the heat storage device when the temperature of the exhaust fluid is higher than the temperature of the heat storage device, and the same flow path may be used for discharging the heat storage device when the temperature of the exhaust fluid is less than the temperature of the heat storage device. As such a charging loop and a discharging loop may share components, such as a flow path through a heat storage device. Here, a flow controller, such as one or more valves, may be employed to control the fluid circuit in which the heat transfer fluid flows.

A particularly preferred heat storage device for use in the present invention is a heat storage described in paragraphs 008-117 and paragraphs 132-141 of International Patent Application No. PCT/US11/22662 (filed by Soukhojak et al. on Jan. 27, 2011), incorporated herein by reference. For example, the heat storage device may include one or more articles (such as a stack of articles) having one or any combination of the following features (e.g., all of the following features): the articles may comprise a capsular structure having one or more sealed spaces, the sealed spaces may encapsulate one or more thermal energy storage materials; the capsular structure may have one or more fluid passages which are sufficiently large to allow a heat transfer fluid to flow through the one or more fluid passages; or when a heat transfer fluid contacts the capsular structure the thermal energy storage material may be isolated from the heat transfer fluid.

For example, the thermal energy storage material may be encapsulated between two metal layers that are sealingly attached to form one or more isolated capsules. Without limitation, the heat storage device may employ a capsule or an arrangement of capsules (e.g., a blister pack or stack of blister packs) described in U.S. Patent Application Publication No. US 2009/0250189 A1, published on Oct. 8, 2009, incorporated herein by reference.

Without limitation, suitable thermal energy storage materials (i.e., TESM) for the heat storage device include materials that are capable of exhibiting a relatively high density of thermal energy as sensible heat, latent heat, or preferably both. The thermal energy storage material is preferably compatible with the operating temperature range of the heat storage device. For example the thermal energy storage material is preferably a solid at the lower operating temperature of the heat storage device, is at least partially a liquid (e.g., entirely a liquid) at the maximum operating temperature of the heat storage device, does not significantly degrade or decompose at the maximum operating temperature of the device, or any combination thereof. The thermal energy storage material preferably does not significantly degrade or decompose when heated to the maximum operating temperature of the device for about 1,000 hours or more, or even for about 10,000 hours or more.

The thermal energy storage material may be a phase change material having a solid to liquid transition temperature. The solid to liquid transition temperature of the thermal energy storage material may be a liquidus temperature, a melting temperature, or a eutectic temperature. The solid to liquid transition temperature may be sufficiently high so that latent heat of fusion is employed in heating the gas producing reactor. Preferably, the solid to liquid transition temperature of the thermal energy storage material is greater than the lower limit operating temperature of the gas producing reactor so that the temperature of the gas producing reactor can be increased or maintained above its lower limiting operating temperature while at least a portion of the thermal energy storage material is in a liquid state. More preferably, the solid to liquid transition temperature of the thermal energy storage material is greater than the lower limit operating temperature of the gas producing reactor by about 10° C. or more, about 20° C. or more, about 30° C. or more, or about 50° C. or more). The solid to liquid transition temperature should be sufficiently low so that the heat transfer fluid, the one or more objects to be heated, or both, are not heated to a temperature at which it may degrade. The desired temperature of the solid to liquid transition temperature may depend on the method of transferring the heat, the thermal losses that may be expected in the heat storage device and/or the discharging loop, any other object that may additionally be heated using the heat storage device, or any combination thereof. The solid to liquid transition temperature is preferably about 190° C. or more, more preferably about 200° C. or more, even more preferably about 230° C. or more, even more preferably about 250° C. or more, even more preferably about 270° C. or more, and most preferably about 300° C. or more. The thermal energy storage material preferably has a solid to liquid transition temperature of about 450° 0° C. or less, more preferably about 400° 0° C. or less, even more preferably less than about 380° C. or less, and most preferably about 250° 0° C. or less. For example, the solid to liquid transition temperature may be from about 200° C. to about 450° C., from about 190° 0° C. to about 400° 0° C., from about 200° 0° C. to about 375° C., from about 225° C. to about 400° 0° C., or from about 200° 0° C. to about 300° 0° C.

It may desirable for the thermal energy material to efficiently store energy in a small space. As such, the thermal energy storage material may have a high heat of fusion density (expressed in units of megajoules per liter), defined by the product of the heat of fusion (expressed in megajoules per kilogram) and the density (measured at about 25° C. and expressed in units of kilograms per liter). The thermal energy storage material may have a heat of fusion density of about 0.1 MJ/liter or more, preferably about 0.2 MJ/liter or more, more preferably about 0.4 MJ/liter or more, and most preferably about 0.6 MJ/liter or more. Typically, the thermal energy storage material has a heat of fusion density of about 5 MJ/liter or less. However, thermal energy storage materials having a higher heat of fusion density may also be employed.

It may be desirable for the thermal energy storage material to be light weight. For example, the thermal energy storage material may have a density (measured at about 25° C.) of about 5 g/cm$^3$ or less, preferably about 4 g/cm$^3$ or less, more preferably about 3.5 g/cm$^3$ or less, and most preferably about 3 g/cm$^3$ or less. The lower limit on density is practicality. The thermal energy storage material may have a density (measured at about 25° C.) of about 0.6 g/cm$^3$ or more, preferably about 1.2 g/cm$^3$ or more, and more preferably about 1.7 g/cm$^3$ or more.

The sealed spaces may contain any art known thermal energy storage material. Examples of thermal energy storage materials that may be employed in the thermal heat storage device include the materials described in Atul Sharma, V. V. Tyagi, C. R. Chen, D. Buddhi, "Review on thermal energy storage with phase change materials and applications", Renewable and Sustainable Energy Reviews 13 (2009) 318-345, and in Belen Zalba, Jose Ma Mann, Luisa F. Cabeza, Harald Mehling, "Review on thermal energy storage with phase change: materials, heat transfer analysis and applications", Applied Thermal Engineering 23 (2003) 251-283, both incorporated herein by reference in their entirety. Other examples of suitable thermal energy storage materials that may be employed in the heat transfer device include the thermal energy storage materials described in U.S. Patent Application Publication Nos. US 2009/0250189 A1 (published on Oct. 8, 2009) and US 2009/0211726 A1 (published on Aug. 27, 2009), both incorporated herein by reference.

The thermal energy storage material may include (or may even consist essentially of or consist of) at least one first metal containing material, and more preferably a combination of the at least one first metal containing material and at least one second metal containing material. The first metal containing material, the second metal containing material, or both, may be a substantially pure metal, an alloy such as one including a substantially pure metal and one or more additional alloying ingredients (e.g., one or more other metals), an intermetallic, a metal compound (e.g., a salt, an oxide or otherwise), or any combination thereof. One preferred approach is to employ one or more metal containing materials as part of a metal compound; a more preferred approach is to employ a mixture of at least two metal compounds. By way of example, a suitable metal compound may be selected from oxides, hydroxides, compounds including nitrogen and oxygen (e.g., nitrates, nitrites or both), halides, or any combination thereof. It is possible that ternary, quaternary or other multiple component material systems may be employed also. The thermal energy storage materials herein may be mixtures of two or more materials that exhibit a eutectic.

The TESM may include lithium cations, potassium cations, sodium cations, or any combination thereof. The TESM may include lithium cations at a concentration from about 20% to about 80 mole %, preferably from about 30% to about 70% based on the total moles of cations in the TESM. The TESM may include lithium nitrate at a concentration from about 20 mole % to about 80 mole % lithium nitrate, based on the total moles of salt in the TESM. The TESM may includes from about 30 mole % to about 70 mole % lithium nitrate and from about 30 mole % to about 70 mole % sodium nitrate. The TESM may include lithium nitrate and sodium nitrate at a total concentration of about 90 wt. % or more (e.g., about 95 wt. % or more) based on the total weight of the TESM. The TESM may include at least one first metal compound that includes a nitrate ion, a nitrite ion, or both; at least one second metal containing material including at least one second metal compound; and optionally including water, wherein the water concentration if any is present is about 10 wt % or less. The TESM may be a eutectic composition including lithium nitrate, sodium nitrate, lithium nitrite, sodium nitrite, or any combination thereof.

The heat transfer fluid (HTF) used to transfer heat into and/or out of the heat storage device may be any liquid or gas so that the fluid flows (e.g., without solidifying) through the heat storage device and the other components (e.g., a heat providing component, one or more connecting tubes or lines, a heat removing component, or any combination thereof). The heat transfer fluids may be single phase (liquid or vapor) heat transfer fluids or two phase (e.g., liquid-vapor) heat transfer fluids. The heat transfer fluid may be any art known heat transfer fluid or coolant that is capable of transferring heat at the temperatures employed in the heat storage device. For example, the heat transfer fluid preferably does not degrade when exposed to the temperatures of the heat storage device and/or the heat exchanger. The heat transfer fluid may be a liquid or a gas. Preferably, the heat transfer fluid is capable of flowing at the lowest operating temperature that it may be exposed to during use (e.g., the lowest expected ambient temperature). For example, the heat transfer fluid may be a liquid or gas at a pressure of about 1 atmosphere pressure and a temperature of about 25° C., preferably about 0° C., more preferably −20° C., and most preferably at about −40° C. Without limitation, a preferred heat transfer fluid for transferring heat into and/or out of the heat storage device is a liquid at about 40° C.

The heat transfer fluid should be capable of transporting a large quantity of thermal energy, typically as sensible heat. Suitable heat transfer fluids may have a specific heat sufficient to transport large quantities of thermal energy and preferably have a specific heat (measured for example at about 25° C.) of about 1 J/g·K or more, more preferably about 2 J/g·K or more, even more preferably about 2.5 J/g·K or more, and most preferably about 3 J/g·K or more. Preferably the heat transfer fluid is a liquid. For example, any art known engine coolant may be employed as the heat transfer fluid. The system may employ a single heat transfer fluid for transferring heat into the heat storage device (e.g., into the thermal energy storage material in the heat storage device) and for removing heat from the heat storage device (e.g., from the thermal energy storage material in the heat storage device). Alternatively, the system may employ a first heat transfer fluid for transferring heat to the thermal energy storage material and a second heat transfer fluid for removing heat from the thermal energy storage material. In a system including a first heat transfer fluid and a second heat transfer fluid, the first heat transfer fluid may through a first flow path in the heat storage device and the second heat transfer fluid flows through a second flow path through the heat storage device.

Without limitation, heat transfer fluids which may be used alone or as a mixture include heat transfer fluids known to those skilled in the art and preferably includes fluids containing water, one or more alkylene glycols, one or more polyalkylene glycols, one or more oils, one or more refrigerants, one or more alcohols, one or more betaines, or any combination thereof. The heat transfer fluid may include (e.g., in addition to or in lieu of the aforementioned fluids) or consist essentially of a working fluid such as one described hereinafter. Suitable oils which may be employed include natural oils, synthetic oils, or combinations thereof. For example, the heat transfer fluid may contain or consist substantially (e.g., at least 80 percent by weight, at least 90 percent by weight, or at least 95 percent by weight) of mineral oil, caster oil, silicone oil, fluorocarbon oil, or any combination thereof.

An exemplary heat transfer fluid includes or consists essentially of one or more alkylene glycols. Without limitation, preferable alkylene glycols include from about 1 to about 8 alkylene oxy groups. For example the alkylene glycol may include alkylene oxy groups containing from about 1 to about 6 carbon atoms. The alkylene oxy groups in a alkylene glycol molecule may be the same or may be different. Optionally, the alkylene glycol may include a mixture of different alkylene glycols each containing different alkylene oxy groups or different ratios of alkylene oxy groups. Preferred alkylene oxy groups include ethylene oxide, propylene oxide, and butylene oxide. Optionally, the alkylene glycol may be substituted. For example the alkylene glycol may be substituted with one or two alkyl groups, such as one or two alkyl groups containing about 1 to about 6 carbon atoms. As such, the alkylene glycol may include or consist essentially of one or more alkylene glycol monoalkyl ethers, one or more alkylene glycol dialkyl ethers, or combinations thereof. The alkylene glycol may also include a polyalkylene glycol. Particularly preferred alkylene glycols include ethylene glycols, diethylene glycol, propylene glycol, and butylene glycol. Any of the above glycols may be used alone or as a mixture.

Examples of single phase heat transfer fluids include biphenyl, diphenyl oxide, or mixtures thereof, such as a eutectic mixture of biphenyl and diphenyl oxide commercially available as DOWTHERM™ Q from Dow Chemical Company; silicone fluids, such as SYLTHERM™ 800 commercially available from Dow Chemical Company; and alkyl substituted aromatics such as THERMINOL® 59 commercially available from Solutia Inc.

Optionally, the heat transfer fluid may include or consist essentially of, or consist entirely of a two-phase heat transfer fluid (i.e., a working fluid). For example, the system may include a working fluid that flows through the heat storage device where it is heated and evaporates and then to one or more components (such as a component to be heated) where the working fluid condenses. As such, the heat storage device may function as an evaporator for the working fluid and a component to be heated may function as a condenser for the working fluid. If a working fluid is employed, the heat provided to the condenser preferably includes the heat of vaporization of the working fluid. The system may include a cold line for returning the working fluid to heat storage device, and a heat line for removing working fluid from the heat storage device. The cold line and the heat line preferably are capable of containing the working fluid without leaking as it is flows through a loop. When the heat storage device (e.g., the thermal energy storage material in the heat storage device) is at a temperature sufficient to cause the combined vapor pressure of all components of the working fluid to exceed about 1 atmosphere and a valve is opened to allow the flow of the working fluid, the working fluid may be a) pumped by a capillary structure; b) at least partially vaporized; c) at least partially transported to the condenser; and d) at least partially condenses in the condenser; so that heat is removed from the heat storage device. As such, the system may optionally include a capillary pumped loop.

The working fluids may be any fluid that can partially or completely evaporate (transition from a liquid to a gaseous state) in the heat storage device when the thermal energy storage material is at or above its liquidus temperature. Suitable working fluids (e.g., for the capillary pumped loop) include pure substances and mixtures having one or any combination of the following characteristics: a good chemical stability at the maximum thermal energy storage system temperature, a low viscosity (e.g., about 100 mPa·s or less), good wetting of the capillary structure (e.g., good wick wetting), chemical compatibility with (e.g., the working fluid causes low corrosion of) the materials of the capillary pumped loop (such as the container material, the materials employed to encapsulate the thermal energy storage material, the materials of the vapor and liquid lines, and the like), a temperature dependent vapor pressure that is conducive to both the evaporator and the condenser temperatures, a high volumetric latent heat of vaporization (e.g., the product of the latent heat of fusion and the density of the working fluid at about 25° C. in units of megajoules per liter may be greater than about 4 MJ/liter), a freezing point less than or equal to the freezing point of the heat transfer fluid of the condenser (e.g., a freezing point less than or equal to the freezing point of antifreeze), or a freezing point less than or equal to about −40° C. For example, the equilibrium state of the working fluid may be at least 90 percent liquid at a temperature of −40° C. and a pressure of 1 atmosphere.

The vapor pressure of the working fluid should be high enough in the evaporator so that a vapor stream is produced that is sufficient to pump the working fluid. Preferably, the vapor pressure of the working fluid should be high enough in the evaporator so that a vapor stream is produced that is sufficient to carry the desired thermal power measured in watts from the evaporator to the condenser. The vapor pressure of the working fluid in the evaporator preferably is sufficiently low so that the capillary pumped loop does not leak and does not rupture.

The wetting of the working fluid to the capillary structure may be characterized by a contact angle of the working fluid on the material of the capillary structure. Preferably, the contact angle is about 80° 0° or less, more preferably about 70° 0° or less, even more preferably about 60° or less, and most preferably about 55° or less.

The working fluid preferably condenses at moderate pressures at temperatures of about 200° C. or less, about 150° C. or less, or about 90° C. or less. For example, the working fluid may condense at about 90° C. at a pressure of about 2 MPa or less, preferably about 0.8 MPa or less, more preferably about 0.3 MPa or less, even more preferably about 0.2 MPa or less, and most preferably about 0.1 MPa or less.

The working fluid preferably can flow at very low temperatures. For example, the working fluid may be exposed to very low ambient temperatures and preferably is capable of flowing from the condenser to the heat storage device at a temperature of about 0° C., preferably about −10° C., more preferably about −25° C., even more preferably about −40° C., and most preferably about −60° C. The working fluid preferably is in a gas state when it is at a temperature of the fully charged heat storage device, such as when the thermal energy storage material is in a liquid state.

The working fluid is capable of efficiently transferring thermal energy from the heat storage device so that the amount of working fluid needed to remove an amount of heat from the heat storage device is relatively small (e.g., compared to a device that uses a heat transfer fluid that is not a working fluid to remove the heat). Preferably a large portion of the heat transferred by the working fluid is transferred in the form of heat of vaporization. The volume of working fluid, the flow rate of the working fluid, or both, may be relatively low in the thermal energy storage compared to a system that employs a heat transfer fluid that is not a working fluid and has the same initial power.

As described above, the working fluid may transfer some of the thermal energy in the form of heat of heat of vaporization. The working fluid preferably has a high heat of vaporization so that the amount of heat that can be transferred is high. Suitable working fluids for the heat storage device may have a heat of vaporization of about 200 kJ/mole or more, preferably about 500 kJ/mole or more, more preferably about 750 kJ/mole or more, even more preferably about 1000 kJ/mole or more, and most preferably about 1200 kJ/mole or more.

The two-phase heat transfer fluid may be any two-phase system having an appropriate boiling temperature. For examples the two-phase heat transfer fluids may include or consist essentially of water, ammonia, (such as a water-ammonia mixture), or a molten metal.

It will be appreciated that the materials that contact with the heat transfer fluid (e.g., the working fluid) may be resistant to corrosion from the fluid. For example, any one or all of the surfaces of the heat storage device or the heat storage system that may come in contact with the heat transfer fluid (e.g., the interior of the working fluid vapor line, the interior of the working fluid liquid line, the internal surfaces of the heat exchanger and the heat storage device, the interior surfaces of one or more valves, a surface of a pump, an interior surface of a fluid reservoir, and the like) may be made of and/or coated with a corrosion resistant material, such as stainless steel.

It will be appreciated that any of the working fluids or heat transfer fluids employed in the thermal energy storage system described herein may include an additives package. Such additive packages are well known to those skilled in the art and are adapted to fit the system in which the device of the invention may be utilized. For example the additives package may include a stabilizer, a corrosion inhibitor, a lubricant, an extreme pressure additive, or any combination thereof.

The heat transfer fluid may be mechanically pumped to transfer heat from the heat source to the heat recipient (e.g., from a heat storage device to a gas producing reactor, or from a heat exchanger to a heat storage device), or may be self-pumped (e.g., using gravity, e.g., thermosiphon, or capillary action). Preferably single phase HTFs are mechanically pumped. Preferably two-phase heat transfer fluids are self-pumped. Heat transfer fluids that are self-pumped may employ a heat pipe, a loop heat pipe or a capillary pumped loop, to return liquid condensed in the condenser attached to the heat recipient to the evaporator attached to the heat source.

The system for generating the reducing gas may include one or more components for storing and/or dosing a solid or liquid reducing material so that a sufficient amount of reducing gas can be generated as needed for the reduction of nitrogen oxides. The system for storing and/or dosing the reducing material may depend on the state of the material (e.g., a liquid state, or a solid state).

Figure 6:
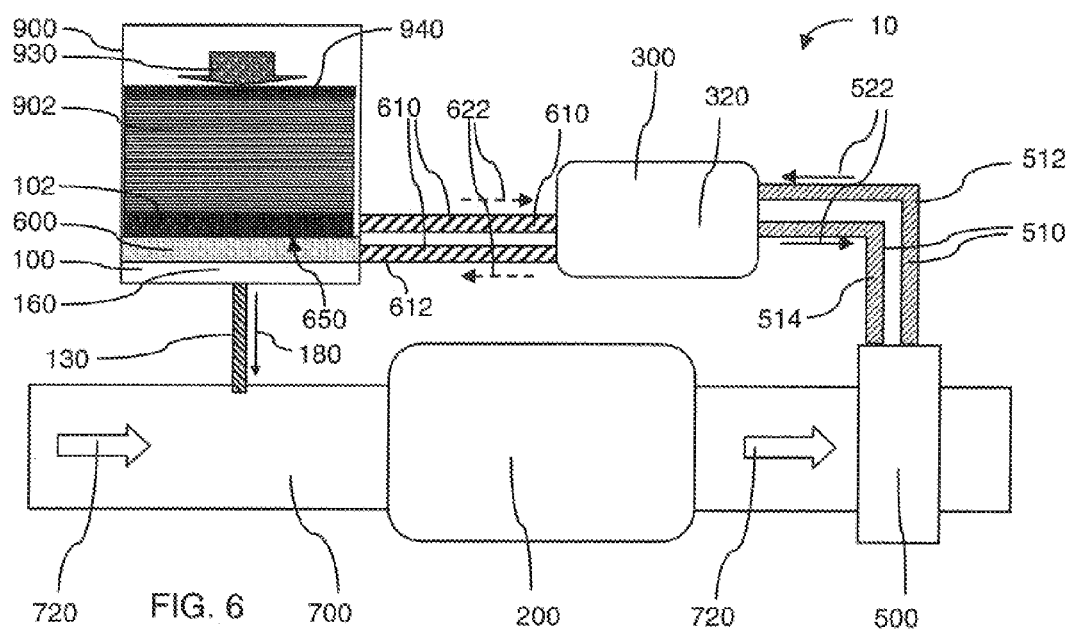
FIG. 6 is a schematic drawing illustrating features of a system that employs a solid reducing material for generating a reducing gas.
Figure 7:
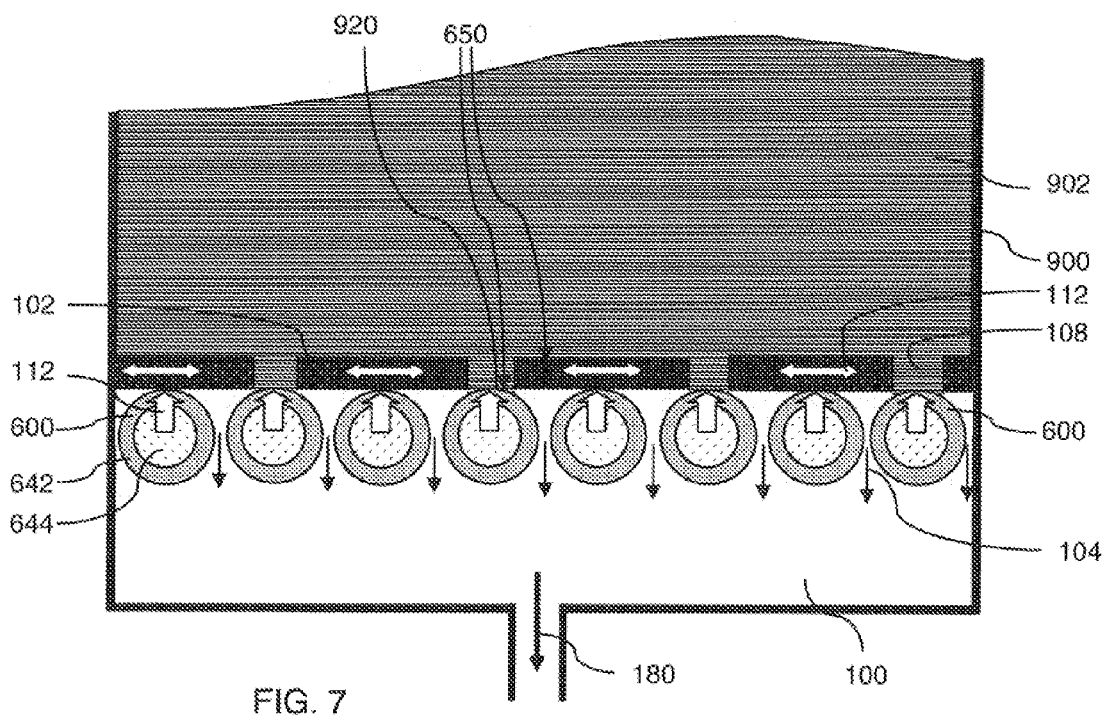
FIG. 7 is a schematic drawing of a cross-sectional view of an example of a heat transfer fluid coil geometry that is 100% solid-blocking.

Features that may be employed in a system for storing and/or dosing a solid reducing material are illustrated in FIGS. 6 and 7. The solid reducing material may be provided in any form sufficient for filling and/or storing in a container (e.g., in a reservoir). For example, the solid reducing material may be provided as a block, as a plurality of particles, such as flakes, powder, granules, pellets, or any combination thereof. If the solid reducing material is provided as a block, it preferably is provided as a block having a generally constant cross-section. The solid reducing material may be stored in a container having any shape. In one preferred arrangement, the container has a generally constant-cross-section compartment so that a force distribution plate can be applied to one end of the material (e.g., near the top of the container) to advance the solid reducing material at an opposing end (e.g., near the bottom of the container). By using a generally constant-cross-section, it may be possible to maintain a force distribution as the material advances in the container. The container for storing the solid reducing material may be integrated into the gas producing reactor. For example, the solid reducing material may be separated from the gas producing reactor by a heated surface, such as the surface of a heated plate, or other structure. The plate or other structure preferably has one or more openings to allow the reducing material to enter a heated region of the gas producing reactor. Depending on the amount of heat transferred to the reducing material, the reducing material may enter the heated region of the gas producing reactor as a solid, liquid, gas, or any combination thereof. The plate may be heated by a heating element, such as a coil containing heat transfer fluid. As such, the plate may be part of a heat exchanger in the gas producing reactor. The heat exchanger preferably is in thermal communication with a region of the solid reducing material that is adjacent to the gas producing reactor so that the solid reducing material is liquefied, evaporated, reacted, or any combination thereof. The storage container may include one or more means for pressing the solid reducing material against the heated surface or otherwise delivering the solid reducing material to the heated surface. For example, the container may include a platform (e.g., a force distribution plate) with a threaded spindle to push the solid reducing material stored in the platform, similar to the operation of a deodorant stick. The spindle can be turned by an electromagnetic actuator/motor or by pneumatic/hydraulic actuator or other similar means. When the solid reducing material is partially or fully consumed, the container may be refilled with additional solid reducing material. For example, one or more block of solid reducing material that at least partially fills the container may be added to the container. The container may be capable of accommodating a plurality of blocks so that the container can conveniently be refilled after various levels of usage (e.g., after about 10% or more, about 20% or more, about 30% or more, about 50% or more, or about 60% or more of the container is emptied). Alternatively, the container may be refilled by adding solid reducing material in a pellet, flake, powder, particulate, granular or other form capable of flowing into the container. Loading of the solid reducing material may include a step of removing the platform, and/or attaching the solid reducing material to the platform.

When using a solid reducing material, the HTF coil in the gas producing reactor may be positioned to allow easy flow of the reducing gas out of the region of the interface between the coil and the solid reducing material. Preferably the HTF coil is designed and/or positioned to prevent any solid reducing material from passing through the coil ungasified. This may be accomplished by proper coil geometry that has gaps for gas flow, but does not have any line-of-sight openings in the direction of sliding of the solid reducing material, i.e., all paths for gas flow through the coil are tortuous, as illustrated in FIG. 7. Although the term HTF coil is used, it will be appreciated that any geometry of the coil may be employed provided that it provides heat to the solid reducing material, allows the flow of the reducing gas, generally blocks the flow of unreacted solid reducing material, or any combination thereof. For example, one or more HTF coils may be used that blocks substantially all or all of the direct flow of the solid or reducing material. Preferably a single 100% solid-blocking HTF coil is used. The gas generating reactor may include a solid-blocking structure such as fins, open-cell foam, or both, that blocks some of, essentially all of, or 100% of the direct flow of the solid reducing material. If employed, the solid blocking structure may be in contact with and/or attached to the HTF coil, the heated plate or both. The HTF coil, the solid blocking structure, the heated plate, or any combination thereof may be designed to increase and/or maximize the heat transfer to the solid reducing material.

The heated plate for heating a solid reducing material in a gas producing reactor may be a metal plate. The heated plate preferably has sufficient thermal conductivity so that it transfers heat away from the interface with the coil, such as illustrated in FIG. 7. The heated plate may have groves or channels on the surface that contacts the solid reducing material so that any gas generated at the interface can be carried into the gas producing reactor. Grooves or channels may be created by etching, by drilling, or other machining processes. The grooves or channels may have any shape or pattern. For example they may be highly skewed, straight, curved, have uniform or varying width or depth, or any combination thereof. The heated plates may be porous, such as by using multiple layers of a mesh material (such as a metal mesh) or by producing the plates using powder metallurgy (e.g., using a step of sintering a powder). The heated plate, as well as the HTF coils are preferably made of a material with high thermal conductivity, high chemical resistance to the solid reducing material and/or the reducing gas, or both. Examples of materials that may be used in the heated plate, a HTF coil in the gas producing reactor, or both include high-thermal-conductivity materials, such as copper, aluminum, or alloys including copper or aluminum. Graphite containing material may also be employed. The heated plate, the heated HTF coil or both, may include a protective layer of a material that is chemically resistant to the solid or liquid reducing material and/or the reducing gas. If employed, such a layer is preferably sufficiently thin so that the thermal conductivity is not sacrificed. Such a thin layer may be applied as a thin coating, such as by electroplating. The protective layer may include or consist of any material that is chemically inert (e.g., to the solid or liquid reducing material or the reducing gas). Examples of materials that may be used for a chemical resistant layer include nickel, platinum, gold, or alloys thereof (e.g., alloys including 50 atomic % or more of nickel, platinum, or gold.

The container may include one or more sensors to measure the fill level of the solid or liquid reducing material in the container. For example, the container may include a position sensor to measure the position of the moving platform position sensor is preferably added to the system to measure the amount of solid or liquid reducing material remaining in the container and/or to measure the rate of its consumption. As discussed herein, a stepper motor may be employed to turn one or more spindles and advance the reducing material. Here, the position of the platform may be determined by keeping track of the cumulative turns performed by the motor (e.g., after the last reducing material re-load, or relative to a loading position).

The rate of heat transfer/exchange among of the heat storage device, exhaust gas, and the gas producing reactor is preferably controlled by the flow rate of one or more heat transfer fluids. The flow of a heat transfer fluid may be controlled with a valve, with a pump (e.g., a mechanical pump), or with other commonly known engineering methods/devices. The flow of a heat transfer fluid preferably is controlled hydraulically. The controller may control the flow of the heat transfer fluid based on the temperature of one or more components, based on the power of the engine, based on the flow of an exhaust gas, based on the concentration of nitrogen oxide in a fluid stream, or any combination thereof. As such, one or more temperature sensor (such as a thermocouple) may be installed. A temperature sensor may be installed to measure a temperature of a heat transfer fluid (e.g., in a delivery line, in a return line, in a component, or any combination thereof), a heat storage device (e.g., the thermal energy storage material in a heat storage device), a gas producing reactor (e.g., a heated surface in a gas producing reactor, or the reducing gas in the gas producing reactor), an exhaust gas (e.g., at a heat exchanger), an SCR reactor, a exhaust tube, a carrier gas, a heat exchanger, or any combination thereof. For example, a temperature sensor may be installed to measure the temperature of the gas producing reactor to determine the amount of heat and or the rate of heat needed to be transfer between the heat storage device and the reactor. The controller may be employed to control the direction of flow of a heat transfer fluid, the flow path of a heat transfer fluid, the rate of flow of a heat transfer fluid, or any combination thereof. For example, the controller may control the flow of and/or the flow rate of a heat transfer fluid between a heat exchanger (e.g., in thermal communication with an exhaust fluid) and a heat storage device, the flow of and/or the flow rate of a heat transfer fluid between a heat storage device and a gas producing reactor, or both. The flow controller may function by controlling the mode of operation of the heat storage device for operating the heat storage device in a charging mode, a storing mode (e.g., when the heat storage device is charged and no heat transfer fluid flows through the device), a discharging mode, a dual charge/discharge mode (e.g., include the flow of two heat transfer fluids), a unitary charge/discharge mode (e.g., using a circulating loop that includes the heat exchanger, the heat storage device, and the gas producing reactor), or any combination thereof.

A controller may monitor a fluid flow rate in one or more locations in the system. A controller may monitor one or more temperatures of the system, compare a temperature of the system to a predetermined value, compare a temperature of the system to a different temperature of the system, or any combination thereof. For example, the controller may control the system so that a fluid flows through the heat storage device and later through the gas producing reactor when the temperature of the gas producing reactor is below a predetermined lower temperature limit, when the temperature of the heat storage device is greater than the temperature of the gas producing reactor, or preferably both. The controller may control the system so that a heat transfer fluid circulates between a heat exchanger and the heat storage device when the temperature of the heat storage device is below a predetermined upper temperature limit, the temperature of the heat exchanger (e.g., the temperature of an exhaust gas in thermal communication with the heat exchanger) is greater than the temperature of the heat storage device, or preferably both. The controller may prevent the flow of a heat transfer fluid between the heat storage device and the heat exchanger when the temperature of the heat storage device is above a predetermined upper temperature limit, the temperature of the heat exchanger is below the temperature of the heat storage device, or both. The controller may function by controlling one or more flows so that the available heat is provided to the device or devices that can benefit from the heat. The controller may have flexibility in its thermal management, and the controller may provide the control for this thermal management, such as by monitoring one or more temperatures and controlling one or more valves.

The heat storage device preferably is capable of operating in one or more modes. The heat storage device is capable of operating in a discharging mode, where stored heat is removed from the heat storage device and transferred to the gas producing reactor. The discharging mode typically is employed when a reducing gas is needed for an SCR reactor and when the temperature of the exhaust gas is less than the temperature of the heat storage device. During the discharging mode, heat may flow from the heat storage device using a heat transfer fluid. The heat may be used for heating a solid surface in the gas producing reactor. During the discharging mode, the temperature of the heat storage device may decrease, the concentration of thermal energy storage material that is in a liquid state may decrease, or both. For example, some or all of the heat transferred to the gas producing reactor may be latent heat, such as latent heat released by solidifying a thermal energy storage material. During the discharging mode, heat transfer fluid circulates through the discharging loop, but heat transfer fluid typically does not circulate through the charging loop.

The heat storage device preferably operates in one or more additional modes such as a charging mode, a dual charging/discharging mode, a by-pass mode, or any combination thereof. During a charging mode, heat generated by operation of the engine (e.g., heat from the exhaust gas produced by the engine) is transferred to the heat storage device. During the charging mode, heat transfer fluid circulates through a charging loop, but heat transfer fluid typically does not circulate through a discharging loop (e.g., no heat is provided to the gas producing reactor). The charging mode may include a step of storing heat in the heat storage device. For example, the charging mode may include a step of increasing the temperature of the thermal energy storage material in the heat storage device, increasing the concentration of thermal energy storage material in that is in a liquid state, or both. The charging mode may be employed when the temperature of the exhaust gas (e.g., the temperature of the exhaust gas at the location of the heat exchanger, preferably located downstream of the SCR reactor) is greater than the temperature of the heat storage device (e.g., greater than the temperature of the thermal energy storage material in the heat storage device). During a dual discharging/charging mode, a heat transfer fluid circulates through a discharging loop and a heat transfer fluid circulates through a charging loop. The dual operating mode is characterized in that both waste heat is captured using a heat exchanger and heat is provided to a gas producing reactor. The dual operating mode may be employed when the temperature of the exhaust gas is greater than the temperature of the heat storage device (e.g., greater than the temperature of the thermal energy storage material in the heat storage device). When the temperature of the heat storage device reaches or exceeds an upper temperature limit, the process may employ the charging mode or alternatively a by-pass mode for heating the gas producing reactor. The by-pass mode may include a step of circulating a heat transfer fluid between the heat exchanger (e.g., downstream of the SCR reactor) and the gas producing reactor. During the by-pass mode, heat transfer fluid preferably does not circulate through the heat storage device.

Figure 2:
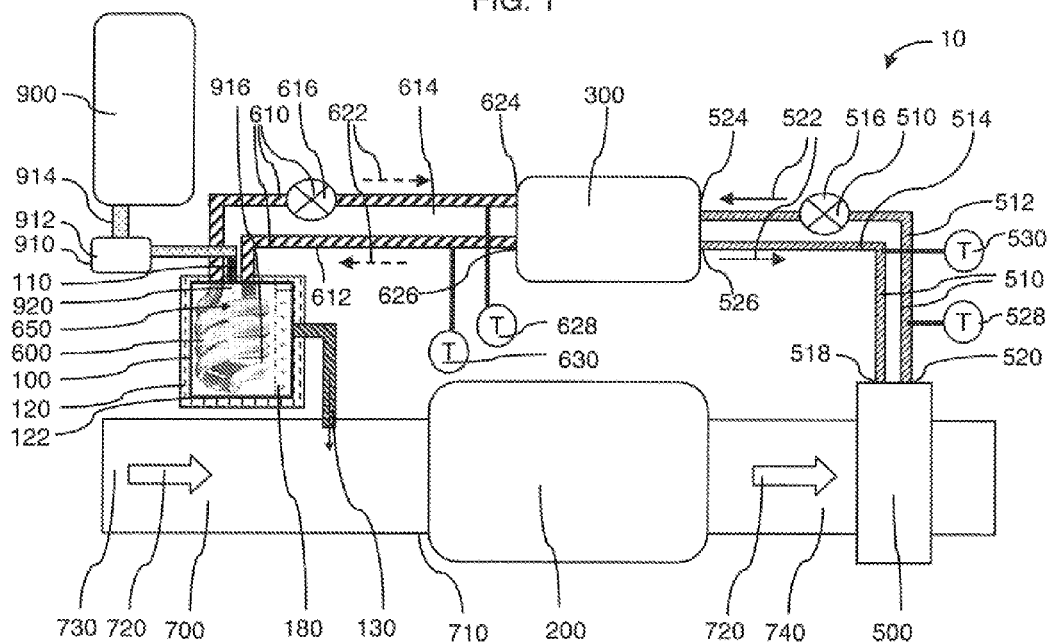
FIG. 2 is another schematic drawing illustrating features of some of the main components of a system for reducing nitrogen oxides in an exhaust gas.

A system 10 for reducing or eliminating the concentration of nitrogen oxide from an exhaust fluid (e.g., exhaust gas) 700 may include a gas producing reactor 100 at least partially positioned inside an exhaust pipe 710, such as illustrated in FIG. 1, or may be positioned outside of an exhaust pipe 710, such as illustrated in FIG. 2. FIGS. 1 and 2 illustrate features that may be included in the system. The gas producing reactor may include one or means of delivering 110 a solid or liquid reducing material 902 into the gas producing reactor 100. For example, the gas producing reactor may include a spray system 110 for delivering the solid or liquid reducing material 902 into the gas producing reactor 100 as a spray (e.g., a spray of droplets, such as a mist) 920. The gas producing reactor typically includes one or more heated surfaces 650 for providing heat to the solid or liquid reducing material 902. The gas producing reactor may include one or more insulating layers 120 for reducing or eliminating the loss of heat from the gas producing reactor 100, such as heat loss through one or more walls 122 of the reactor. The gas producing reactor 100 may heat the solid or liquid reducing material 902 to a temperature sufficiently high so that a reducing gas is produced. Once generated, the reducing gas flows 180 out of the gas producing reactor 100 and into a flow of exhaust gas 700. For example, the reducing gas may flow 180 through one or more openings 182 (e.g., exits) in the gas producing reactor and combine with an exhaust gas 700. The reducing gas may flow 180 through a reducing gas transfer line 130, such as illustrated in FIG. 2.

The gas producing reactor 100 may include a heat exchanger 600 for providing heat to the solid or liquid reducing material. The heat exchanger 600 of the gas producing reactor 100 may include one or more coils in which a heat transfer fluid can flow. The heat exchanger 600 of the gas producing reactor 100 may be in fluid communication with a heat storage device 300 using a discharging loop 610 capable of flowing heat from the heat storage device 300 to the heat exchanger 600. The direction of circulation of the heat transfer fluid 622 preferably results in a continuous path (e.g., a loop). The discharging loop 610 may include an inlet 624 and an outlet 626 for flowing the heat transfer fluid respectively into and out of the heat storage device 300. The discharging loop 610 may include a transfer line 612 for flowing the heat transfer fluid from the heat storage device 300 to the gas producing reactor 100, a return line 614 for flowing the heat transfer fluid from the gas producing reactor 100 to the heat storage device 300, or both. The discharging loop 610 may include a flow regulator 616, such as a pump, valve or other device for controlling whether the heat transfer fluid flows and/or the flow rate of the heat transfer fluid. The system may include one or more temperature sensors 628, 630, capable of measuring one or more temperatures, such as a temperature of the heat transfer fluid (e.g., in the transfer line 612, the return line 614, or both), the heat storage device 300, the gas producing reactor 100 (e.g., a heated surface of the gas producing reactor 650), or any combination thereof.

The heat storage device 300 preferably is capable of receiving (e.g., absorbing heat), storing the heat, and releasing the heat. The heat storage device may include one flow paths 310 for receiving heat, for releasing heat, or both. For example, the heat storage device may include one flow path that flows through both a discharging loop 610 and through a charging loop 510. The heat storage device may include a plurality of flow paths 310, such as a first flow path that is part of a discharging loop 610 and a second flow path that is part of a charging loop, 510, such as illustrated in FIG. 1.

The charging loop 510 may be employed to transfer heat from a heat source, such as a source of waste heat, to the heat storage device 300. For example, the charging loop may use heat from an exhaust gas 700. If an exhaust gas 700 is employed as the heat source, the heat is preferably removed from the exhaust gas at a location downstream of an SCR reactor 200. The heat from the exhaust gas 700 may be removed from the exhaust gas using any thermal connection between the heat storage device 300 and the exhaust gas 700. For example, a heat exchanger 500 may be employed for removing the heat from the exhaust gas. The heat exchanger 500 may be part in thermal communication with the heat storage device 300 using a heat transfer fluid that circulates through the charging loop. The charging loop may include a transfer line 512 for flowing heat transfer fluid from the heat source (e.g., from the heat exchanger 500) to the heat storage device 300, a return line 514 for flowing the heat transfer fluid from the heat storage device to the heat source, or preferably both. The heat storage device may include an inlet 524 for flowing the heat transfer fluid into the device, and an outlet 526 for flowing the fluid out of the device. The heat exchanger may include an inlet 518 and an outlet 520, respectively for flowing the heat transfer fluid into and out of the heat exchanger. The charging loop 510 may include a flow regulator 516 for controlling when the heat transfer fluid flows through the charging loop and or controlling the flow rate of the heat transfer fluid. The flow regulator may be a pump, one or more valves, or any combination thereof. The charging loop may include one or more temperature sensors 528, 530 for measuring the temperature of the heat exchanger, a heat transfer fluid (e.g., in the transfer line, in the return line, or both), the exhaust gas, the heat storage device, or any combination thereof.

The system preferably includes an SCR reactor 200 capable of catalytically reacting nitrogen oxide with the reducing gas so that the concentration of nitrogen oxide is reduced.

The system may include one or containers for storing the solid or liquid reducing material 900 for later use (e.g., for later converting into a reducing gas in the gas producing reactor 100) and/or a dosing system 910 for providing the solid or reducing material 900 to the gas producing reactor. The container 900 preferably is capable of storing a sufficient amount of the solid or liquid reducing material so that nitrogen oxide can be removed from the exhaust gas 700 for about 1 hour or more, about 10 hours or more, about 50 hours or more, about 150 hours or more, or about 300 hours or more. The dosing system 910 may include a one or more pumps 912, valves, feed screws, or any combination thereof for metering and or flowing the solid or liquid reducing material from the container 900 to the gas producing reactor 100. The dosing system may include a transfer line 914 (e.g., a delivery tube) for transferring the material to a pump 912, a transfer line 916 (e.g., a delivery tube) for transferring the material from the pump to the reactor 100, or both.

When the heat storage device 300 provides heat to the gas producing reactor 100 and the reducing gas is generated, the concentration of nitrogen oxide in the downstream exhaust gas 740 (i.e., after the exhaust gas passes through the SCR reactor 200) preferably is less than the concentration of nitrogen oxide in the upstream exhaust gas 730 (i.e., before the exhaust gas is combined with the reducing gas). The exhaust gas 700 may flow through one or more exhaust pipes 710, a region where the exhaust gas combines with the reducing gas, an SCR reactor 200, a heat exchanger 500, or any combination thereof.

Figure 3C:
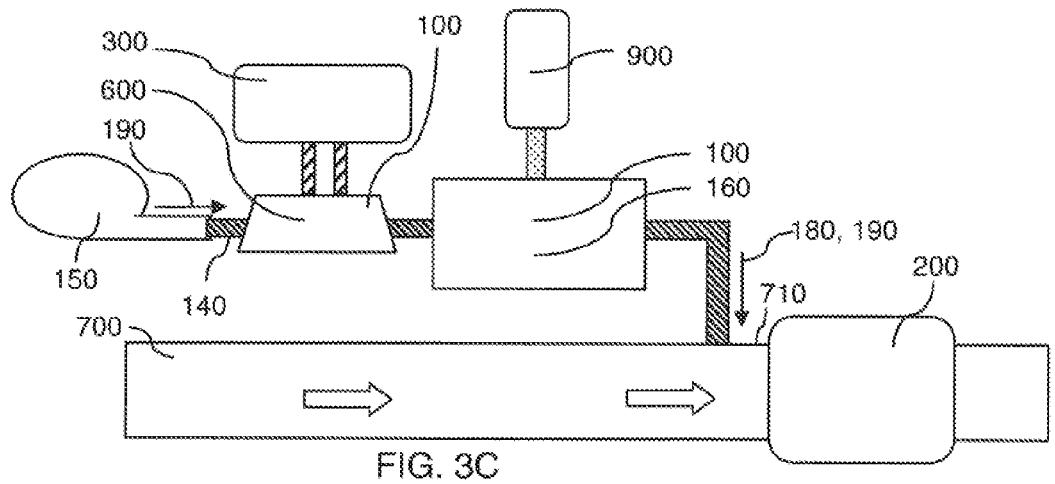

The gas producing reactor 100 may employ a carrier gas for transporting the reducing gas from the gas producing reactor 100 to an exhaust pipe 710, to heat the solid or liquid reducing material 902 and/or a reaction chamber 160, or both, such as illustrated in FIGS. 3A, 3B and 3C. The system may include a carrier gas line 140 for providing the carrier gas to the gas producing reactor 100 (e.g., to the heat exchanger 600 and/or the reaction chamber). Some or all of the carrier gas may be obtained from the exhaust gas, such as illustrated in FIGS. 3A and 3B, or the carrier gas may be obtained from a source other than the exhaust (e.g., air), such as illustrated in FIG. 3C. If exhaust gas is used as the carrier gas, preferably only a portion (e.g., a small portion, such as less than 30%, less than 10% or less than 3%) of the exhaust gas flows through the carrier gas transfer line 140 so that heat from the heat storage device is not needed to heat all of the exhaust gas. The carrier gas line 140 may be in fluid connection with an exhaust pipe 710. The carrier gas line 140 may be in fluid connection with a fan or blower 150 or other device for introducing air into the system. The system may include one or more carrier gas flow regulators 170 and or one or more fans or blowers 150 for controlling the flow of the carrier gas. The flow of the carrier gas 190 may proceed from a source of the carrier gas, through the gas producing reactor and to the exhaust system where the carrier gas combines with the exhaust gas (e.g., a portion of the exhaust gas that does not flow through the gas producing reactor) upstream of the SCR reactor 200.

When the carrier gas is cold (e.g., below the lower limit operating temperature of the gas producing reactor), the carrier gas may be heated using heat from the heat storage device 300, such as heat transferred to the heat exchanger 600 of the gas producing reactor 100 (e.g., using a heat transfer fluid that circulates in a discharging loop 610). The heat exchanger 600 of the gas producing reactor 100 may be insider a reaction chamber 160 (e.g., where the reducing gas is produced), such as illustrated in FIG. 3A. The heat exchanger 600 of the gas producing reactor may be outside of the reaction chamber 160, such as illustrated in FIGS. 3B and 3C. For example, the carrier gas may first flow through the heat exchanger 600 so that the temperature of the carrier gas is increased and then the carrier gas may flow into the reaction chamber 160 where the heat of the carrier gas is employed for heating the solid or liquid reducing material.

If exhaust gas is employed as a carrier gas, there may be times when the discharging loop is not needed to heat the carrier gas and/or the solid or liquid reducing material. For example, when the exhaust gas is sufficiently hot (e.g., when the engine is operating at a generally high power), the gas producing reactor 100 may be operated without providing heat from the heat storage device 300.

Although FIGS. 3A, 3B, and 3C do not show a separate charging loop for providing heat to the heat storage device 300, such a loop may be included, or the system may use the fluid connection (e.g., the discharging loop) between the heat storage device 300 and the heat exchanger 600 of the gas producing reactor 100 when the temperature of the carrier gas is sufficiently high for both charging the heat storage device and for producing the reducing gas.

It will be appreciated that the reducing gas may exit the gas producing reactor without the need of a carrier gas, such as illustrated in FIG. 1, so that heat is not needed for heating the carrier gas, and thus providing more heat for heating the solid or liquid reducing material.

Figure 4A:
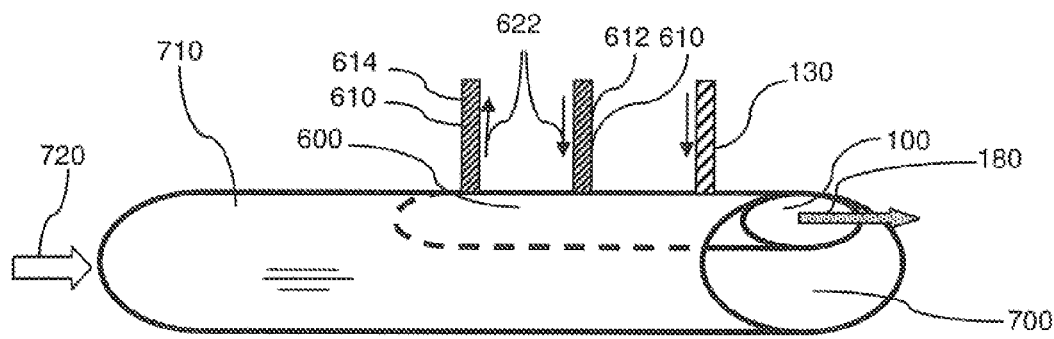
FIGS. 4A and 4B are schematic drawings illustrating features of a gas producing reactor that may be employed inside of an exhaust pipe.

The gas producing reactor 100 may be positioned inside an exhaust pipe 710 or other component in which some or all of the exhaust gas 700 flows 720, such as illustrated in FIG. 4A. For example, the gas producing reactor may be a tubular reactor 118 with a fluid connection (such as a discharging loop 610) to a heat storage device 300 (not illustrated). The fluid connection may include a delivery line 612 and a return line 614, for flowing 622 a heat transfer fluid. The delivery line 612 and the return line 614 may be connected to a heat exchanger 600 located inside the gas producing reactor 100.

Figure 4B:
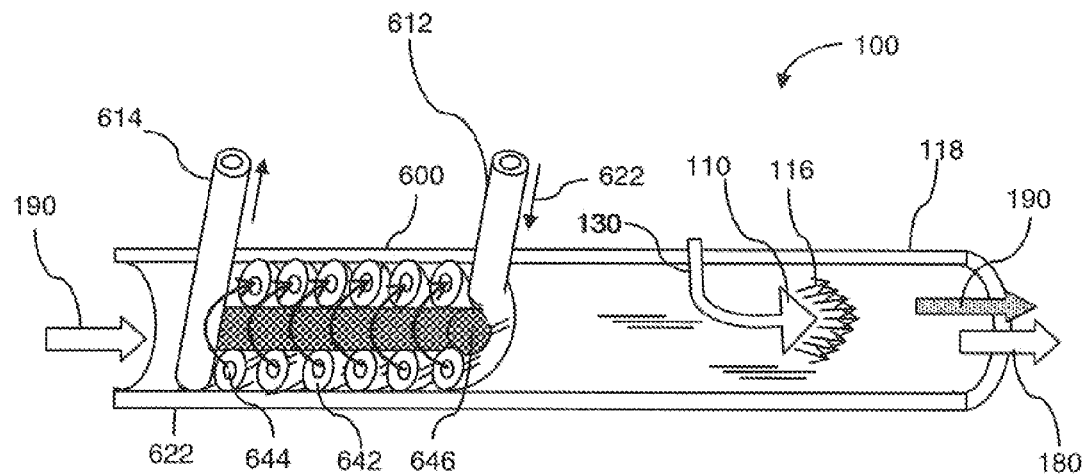

FIG. 4B is a sectional view illustrating features of the gas producing reactor of FIG. 4A. A portion of the exhaust gas may be employed as a carrier gas 190 that flows through the gas producing reactor 100. The carrier gas may flow through a heat exchanger 600. The heated carrier gas may contact the spray 116 of a liquid reducing material and heat the material sufficiently to generate the reducing gas. The reducing gas may flow 180 out of the gas producing reactor along with the flow of the carrier gas 190. The flows of carrier gas 190 and the reducing gas 180 may combine with the rest of the exhaust gas at a position upstream of the SCR reactor so that the combined flow includes a sufficient amount of reducing gas for reducing the nitrogen oxides in the exhaust gas.

The flow of the carrier gas through the heat exchanger may be tortuous so that the amount of heat transferred to the carrier gas is increased, so that the flow rate of the carrier gas is reduced, or both. For example, the carrier gas may flow in a spiral path, such as a spiral path defined by the outside of a wound heat transfer tube 642. The heat transfer fluid 644 may flow in a spiral path 622 through the reactor, as illustrated in FIG. 4B. The carrier gas may be prevented from flowing in a straight path through some or all of the gas producing reactor 100 (e.g., through the heat exchanger 600), such as by the use of a barrier structure 646 capable of modifying the flow of the carrier gas. The size of the heat transfer tube 642, the barrier structure 646, and the tubular reactor 118 may be selected so that flow of carrier gas between the heat transfer tube 642 and the tubular reactor 118 is reduced or minimized, so that flow of carrier gas between the heat transfer tube 642 and the barrier structure 646 is reduced or eliminated, or both.

Figure 5A:
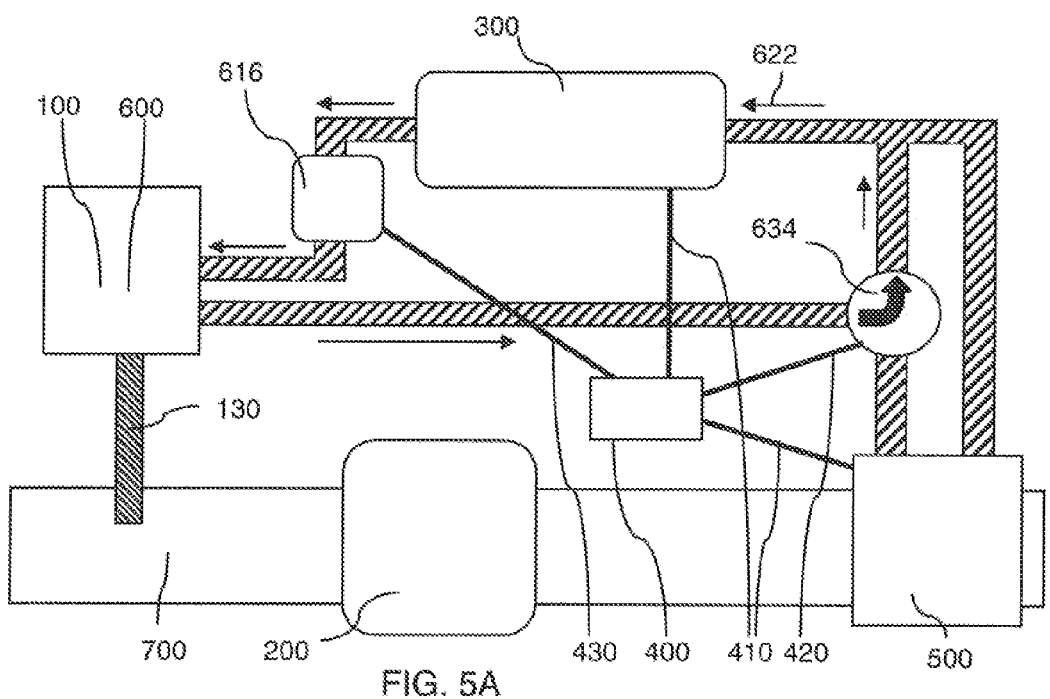
FIGS. 5A and 5B are schematic drawing illustrating features of a controller for controlling the flow of one or more heat transfer fluids.

The system may include a controller 400 for controlling the flow of one or more heat transfer fluids, such as illustrated in FIGS. 5A and 58. The system may include connections between the controller and one or more temperature sensors 410. The system may include connections between the controller and one or more valves 420. The system may include connections between the controller and one or more pumps 430. The controller 400 may control a charging loop, a discharging loop, a carrier gas flow, a dosing system, or any combination thereof.

Figure 5B:
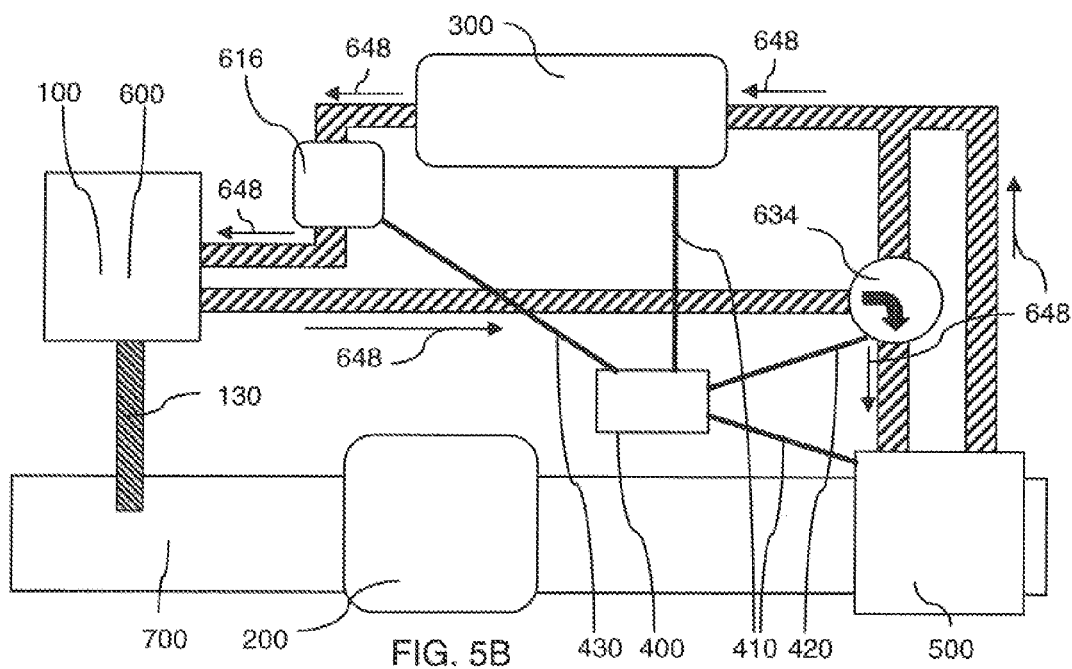

The discharging loop may share one or more lines for transferring a heat transfer fluid with one or more other loops (e.g., with a discharging loop), such as illustrated in FIGS. 5A and 5B. In FIG. 5A, a valve 634 is positioned so that the heat transfer fluid circulates through a discharging loop so that heat stored in the heat storage device 300 is transferred to the gas producing reactor 100. In FIG. 5B, the valve 634 is positioned so that the heat transfer fluid circulates through a unitary charging/discharging loop where the heat transfer fluid is heated by the exhaust gas 700, some of the heat is then transferred to the heat storage device and some of the heat is used for heating the gas producing reactor. As illustrated in FIG. 5A, the heat storage device may employ a single path through the heat storage device for both charging and discharging the heat storage device.

FIG. 6 is a schematic showing some main components of a system for heating a solid reducing material 902 using stored heat. As shown in FIG. 6, the heat may be stored in a heat storage device 300 that contains a thermal energy storage material 320 (e.g., a phase change material). The heat storage device may capture (e.g., absorb) waste heat from an exhaust gas 700, such as via a heat exchanger 500. The heat storage device 300 may store the waste heat for future use. For example, the heat storage device 300 may release a portion or all of the stored heat, preferably on demand, into a gas producing reactor 100 that contains the solid reducing material 902, so that a reductant gas is produced.

The entire system as illustrated in FIG. 6 may include a heat exchanger 500 in thermal communication with the exhaust gas 700, components 512, 514 for transferring heat from the exhaust gas heat exchanger 500 to the heat storage device 300, and components 612, 614 for transferring stored heat from the heat storage device 300 to the gas producing reactor 100. The heat transfer process may be based on a heat transfer fluid that is either mechanically pumped or self-pumped due to a liquid-gas phase transition in the HTF (e.g., using a capillary pumped loop, a thermosiphon mechanism, or the like). The rate of heat exchange among the heat storage device, the heat source (exhaust gas), and the heat sink (the reducing gas producing reactor) may be controlled by the flow rate of HTF. For example, such a heat exchange may be controlled hydraulically with a valve or with a mechanical pump. The solid reducing material 902 may be stored in a container 900. The gas producing reactor may include a plate 102 or other structure that generally separates the container 900 form the gas producing reactor 100. The plate 102 may be a metal plate or other plate capable of being heated. The plate 102 may be have openings so that reducing material or reducing gas is capable of flowing from the container 900 to the gas producing reactor 100. The solid reducing material 902 may be positioned between the plate 102 (e.g., the heated plate) and another opposing plate or structure (such as a top plate) 940. The system may include one or more features that forces the opposing plate towards the heated plate 102, so that the opposing plate 940 generally directs the solid reducing material 902 towards a surface of the heated plate 102. The heated plate may be a heated surface 650 of the gas producing reactor and/or may be in contact with one or more other heated surfaces of the gas producing reactor.

FIG. 7 illustrates features of the gas producing reactor 100 and the container 900 of FIG. 6. The gas producing reactor 100 may include a heat exchanger 600, such as a heat exchanger that includes a tube 642 capable of carrying a heat transfer fluid 644. Heat from the heat transfer fluid 642 may flow to the tube 644. The tube 644 may be in thermal contact with the plate 102, so that the plate is heated. The heat flow 112 may include a heat flow from the heat transfer fluid to the tube, a heat flow from the tube to the plate, a heat flow along the plate, or any combination thereof. The solid reducing material may contact a heated surface 650, such as a heated surface of the plate 102, a heated surface of the tube 642, or both. The tube 642 may be positioned so that it is 100% blocking so that the solid reducing material 902 does not pass the tube 642. Instead, as the solid reducing material enters 920 the region of the gas producing reactor, the solid reducing material is heated by a heated surface 650 so that the reducing gas is produced and flows 104 past the tube 644.

The various features described herein, such as the features illustrated in the figures, may be combined. For example, a controller, such as illustrated in FIG. 4, may be employed with the exemplary systems depicted in any of the other figures. Furthermore, the present invention may be used in combination with additional elements/components/steps. For example the system may include a turbine to convert a part of the heat captured from the exhaust gas waste heat into useful mechanical or electrical work and thus improve the overall efficiency of the engine.

It will be appreciated that the heat storage device may be further employed to heat one or more components in addition to the gas producing reactor. For example, the heat storage device may additionally provide heat for an engine oil (e.g., a reservoir of engine oil), heating a passenger compartment, for heating a catalytic converter, for heating a vehicle emission, a reservoir including wiper fluids, a stream of air for defrosting a window, or any combination thereof.

While the present invention may be susceptible to various modifications and alternative forms, the exemplary embodiments discussed above have been shown by way of example. However, it should again be understood that the invention is not intended to be limited to the particular embodiments disclosed herein. Indeed, the present techniques of the invention are to cover all modifications, equivalents, and alternatives falling within the spirit and scope of the invention as defined by the following appended claims.

10 System for removing nitrogen oxide from an exhaust
100 Gas producing reactor (GPR) (e.g., ammonia producing reactor)
102 Plate separating the GPR and the container (e.g., metal plate), preferably with openings
104 Flow of reducing gas
106 Contact between a heated surface and a solid reducing material
108 Opening in the plate
110 Delivery system, such as a spray system for delivering solid or liquid reducing material (e.g., urea containing material)
112 Flow of heat from the heat transfer fluid to the solid reducing material
116 Spray of liquid reducing material
120 Insulating layer of the gas producing reactor
122 Wall of gas producing reactor
130 Reductant gas transfer line (e.g., for flow of ammonia to exhaust)
140 Carrier gas line for providing carrier gas to the gas producing reactor
150 Fan, blower, or pump for providing a carrier gas to the gas producing reactor
160 Reaction chamber
170 Carrier gas flow regulator
180 Flow of reductant gases (e.g., ammonia) from the GPR into the exhaust stream.
190 Flow of Carrier gas
200 SCR Reactor
300 Heat Storage Device (HSD)
310 Flow path in heat storage device for flow of a heat transfer fluid
320 Thermal Energy Storage Material
400 Controller
410 Temperature Measurement
420 Connection for controlling a valve
430 Connection for controlling a flow regulator such as a pump
500 Heat Exchanger for Removing Heat from Exhaust Gas (e.g., to heat storage device)
510 Charging Loop—for charging HSD with heat from exhaust (heat exchanger 500)
512 Transfer line (of charging loop) for flow of heat transfer fluid (HTF) to HSD
514 Return line (of charging loop) for flow of HTF to the heat exchanger 500
516 Valve or pump for controlling flow of HTF in the charging loop
518 Inlet of heat exchanger 500 for flowing HTF from the HSD
520 Outlet of heat exchanger 500 for flowing HTF to the HSD
522 Flow Direction of HTF in charging loop
524 Inlet of HSD for flowing HTF from the heat exchanger 500
526 Outlet of HSD for returning HTF to the heat exchanger 500
528 Temperature of the HTF in the transfer line of the charging loop
530 Temperature of the HTF in the return line of the charging loop
600 Heat Exchanger for Providing Heat for the Gas Producing Reactor (GPR)
610 Discharging loop for flow of heat from heat storage device to gas producing reactor
612 Transfer line (of discharging loop) for flow of heat transfer fluid from HSD to GPR
614 Return line for flow of HTF from GPR to HSD
616 Valve or pump for controlling flow of HTF in the discharging loop
622 Flow direction of the HTF in the discharging loop
624 Inlet for flowing HTF into the HSD (e.g., from the return line)
626 Outlet for flowing HTF from the HSD (e.g., to the transfer line)

628 Temperature of the HTF in the transfer line of the discharging loop
630 Temperature of the HTF in the return line of the discharging loop
642 Tube of heat exchanger
644 Heat transfer fluid
646 Barrier structure for modifying the flow of the carrier gas
648 Unitary charging/discharging loop
650 Heated surface in the gas producing reactor
700 Exhaust Gas
710 Exhaust Tube or Exhaust Pipe
720 Flow direction of the Exhaust gas
730 Exhaust gas before reacting in the SCR reactor
740 Exhaust gas after reacting in the SCR reactor
900 Container for the reducing material
902 Solid or liquid reducing material
910 Dosing system
912 Dosing system pump
914 Transfer line (e.g., delivery tube) to the dosing system pump or valve
916 Transfer line (e.g., delivery tube) from the dosing system pump or tube to the heat exchanger 600
920 Solid or liquid reducing material entering the gas producing reactor (e.g., entering as a spray)
930 Force on reducing material
940 Opposing plate or structure (e.g., for applying and/or distributing a force to the reducing material)

What is claimed is:

1. A system comprising
   i. a container for containing a supply of a solid or liquid reducing material, wherein the container has one or more exits so that the reducing material can be removed from the container;
   ii. a gas producing reactor for converting at least some of the solid or liquid reducing material into ammonia and carbon dioxide, wherein the gas producing reactor is in fluid communication with the one or more exits of the container; and
   iii. a heat storage device in thermal communication with the as producing reactor and/or a region of the one or more exits of the container, wherein the heat storage device includes one or more thermal energy storage material in a sufficient amount so that the heat storage device is capable of heating at least a solid surface of the gas producing reactor and/or least one or more exits of the container to a temperature sufficient for producing ammonia and/or carbon dioxide.

2. The system of claim 1, wherein the thermal communication between the heat storage device and the gas producing reactor and/or the region of the one or more exits of the container includes one or more paths capable of circulating a heat transfer fluid so that heat can be removed from the heat storage device and transferred to the gas producing reactor and/or the region of the one or more exits of the container.

3. The system of claim 2, wherein the system includes one or more paths for transferring thermal energy from an exhaust of combustion engine to the heat storage device including one or any combination of the following:
   i) a heat pipe in thermal communication between the exhaust and the heat storage device;
   ii) a loop in thermal communication between the exhaust and the heat storage device, wherein the loop is capable of flowing a heat transfer fluid; or
   iii) a flow of at least a portion of the exhaust through the heat storage device.

4. The system of claim 3, wherein the thermal energy storage material has a liquidus temperature of about 150° C. or more; the heat storage device includes a sufficient amount of thermal energy storage material so that the device is capable of heating at least a solid surface of the gas producing reactor and/or at least one more exits of the container to a temperature of about 200° C. or more.

5. The system of claim 4, wherein the solid or liquid reducing material is a liquid, and the gas producing reactor includes a sprayer for spraying the solid or liquid reducing material into the gas producing reactor.

6. The system of claim 5, wherein the gas producing reactor includes a heat exchanger for transferring heat from a heat transfer fluid to a solid surface of the gas producing reactor.

7. The system of claim 4, wherein the solid or liquid reducing material is a solid and the heat storage device is in thermal communication with the one or more exits of the container, so that the solid or liquid reducing material can be heated to a temperature of 200° C. or more prior to entering the gas producing reactor.

8. The system of claim 7, wherein the gas producing reactor includes a heat exchanger for transferring heat from a heat transfer fluid to a solid surface of the gas producing reactor.

9. The system of claim 4, wherein the gas producing reactor includes a heat exchanger for transferring heat from a heat transfer fluid to a solid surface of the gas producing reactor.

10. The system of claim 4, wherein the gas producing reactor includes an exhaust gas inlet for receiving a portion of the exhaust as so that the portion of the exhaust gas can be used as a carrier gas, wherein the exhaust as inlet is arranged so that the carrier gas passes through a solid surface of the gas producing reactor having a temperature greater than about 200° C. prior to contacting the solid or liquid reducing material, so that the carrier gas can heat and convey the reducing material and/or the reaction products therefrom.

11. A method comprising the steps of:
   maintaining a solid surface temperature of a vehicle ammonia-producing reactor above 200° C. using stored waste heat that includes a step of at least partially discharging the head storage device, wherein the stored waste heat is stored in a heat storage device, and the heat storage device includes a thermal energy storage material having a liguidus temperature of about 150° C. or more; and
   at least partially charging the heat storage device using heat from the exhaust of an internal combustion engine so that the temperature of the thermal energy storage material increases and/or the concentration of the thermal energy storage material that is in a liquid state increases;
   wherein the charging and discharging steps are asynchronous.

12. The method of claim 11, wherein
   the step of at least partially discharging heat includes circulating a first heat transfer fluid between the heat storage device and the ammonia-producing reactor and/or a component that is in thermal communication with the ammonia-producing reactor using a heat pipe or a fluid loop; and
   the step of at least partially charging the heat storage device includes circulating a second heat transfer fluid between the heat storage device and the exhaust of an internal combustion engine and/or a component in thermal communication with the exhaust using a heat pipe or a fluid loop.

13. The method of claim 11, wherein the process includes
   a thermolysis step of heating urea to a temperature sufficiently high so that ammonia is produced;
   a hydrolysis step at a temperature sufficiently high so that ammonia and carbon dioxide is produced; and a step of reacting ammonia with NO and/or $NO_2$ molecules, and optionally $O_2$, in the presence of a catalyst so that $N_2$ is produced.

14. A method comprising:
feeding a feed portion of solid or liquid reducing material into a gas producing reactor;
heating the feed portion of the solid or liquid reducing material, using heat stored in a heat storage device, to a temperature sufficiently high that thermolysis and/or hydrolysis occurs;
wherein the solid or liquid reducing material has a concentration of urea of about 50 wt. % or more, based on the total weight of the solid or liquid reducing material; and
the heat storage device includes a thermal energy storage material having a liquidus temperature sufficiently high that the urea-containing material can be heated using latent heat and/or sensible heat from the thermal energy storage material and a step of storing heat that includes melting at least a portion of the thermal storage material.

15. The process of claim 14, wherein the thermal energy storage material has a liquidus temperature from about 150° C. to about 450° C.

16. The process of claim 15, wherein
the solid or liquid reducing material is a urea-containing material; and
the process includes:
reacting the urea-containing material to produce ammonia;
adding the ammonia to an exhaust gas containing one or more nitrogen oxides of an internal combustion engine; and
catalytically reacting the ammonia with nitrogen oxides that the concentration of nitrogen oxide in the exhaust gas is reduced.

17. The process of claim 16, wherein the solid or liquid reducing material includes less than 40 wt. % water so that the amount of thermal energy wasted in vaporizing the water is reduced.

18. The process of claim 17, wherein the solid liquid reducing material is an urea-containing material and the urea-containing material includes from about 15 to about 30 wt. % water, based on the total weight of the urea-containing material.

19. The process of claim 14, wherein the solid or liquid reducing material is an urea-containing material, the urea-containing material is stored in a reservoir as a solid material; and
the process includes conveying the feed portion of the solid urea-containing material so that the feed portion of the urea-containing material contacts a solid surface having a temperature of about 200° C. or more.

20. The process of claim 19 wherein the step of conveying the urea-containing material includes a step of rotating a screw so that the urea-containing material advances from the reservoir;
wherein the screw is
i) a positioning screw, and the positioning screw advances a plate or plunger that forces the urea-containing material from the reservoir; or
ii) a conveying screw positioned inside a feed tube and the urea-containing material advances along the feed tube during the rotating of the conveying screw.

* * * * *

UNITED STATES PATENT AND TRADEMARK OFFICE
CERTIFICATE OF CORRECTION

PATENT NO. : 8,361,422 B2
APPLICATION NO. : 13/209630
DATED : January 29, 2013
INVENTOR(S) : Andrey Soukhojak and David H. Bank Page 1 of 1

It is certified that error appears in the above-identified patent and that said Letters Patent is hereby corrected as shown below:

In the Claims:

In Column 29, line 40, "as" should read -- gas --.

In Column 30, line 28, "as" should read -- gas --.

In Column 30, line 39, "head" should read -- heat --.

In Column 32, line 8, please add "or" after the word "solid".

Signed and Sealed this
Twenty-fifth Day of June, 2013

Teresa Stanek Rea
*Acting Director of the United States Patent and Trademark Office*